United States Patent [19]
Williams et al.

[11] Patent Number: 6,032,147
[45] Date of Patent: *Feb. 29, 2000

[54] METHOD AND APPARATUS FOR RATIONALIZING DIFFERENT DATA FORMATS IN A DATA MANAGEMENT SYSTEM

[75] Inventors: Dale L. Williams, Great Falls; Michael E. Peterson, McLean, both of Va.

[73] Assignee: LinguaTeq, Inc., McLean, Va.

[*] Notice: This patent is subject to a terminal disclaimer.

[21] Appl. No.: 08/825,276

[22] Filed: Mar. 27, 1997

Related U.S. Application Data

[63] Continuation-in-part of application No. 08/639,073, Apr. 24, 1996, Pat. No. 5,845,283.

[51] Int. Cl.[7] .................................................. G06F 17/30
[52] U.S. Cl. ................... 707/101; 707/1; 707/4
[58] Field of Search ................... 707/101, 102, 707/1, 4; 395/500, 200.36

[56] References Cited

U.S. PATENT DOCUMENTS

| | | | |
|---|---|---|---|
| 5,119,465 | 6/1992 | Jack et al. ................................ | 395/500 |
| 5,497,491 | 3/1996 | Mitchell et al. ....................... | 395/683 |
| 5,530,852 | 6/1996 | Meske, Jr. et al. ................. | 395/200.36 |
| 5,627,972 | 5/1997 | shear .................................. | 395/200.76 |
| 5,627,997 | 5/1997 | Pearson et al. ........................ | 395/500 |

OTHER PUBLICATIONS

Generic Database Interface, No. 318, Oct. 1, 1990, p. 794.

*Primary Examiner*—Wayne Amsbury
*Assistant Examiner*—Cheryl Lewis
*Attorney, Agent, or Firm*—McDermott, Will & Emery

[57] ABSTRACT

A record conversion device and method, including a preferably software implemented conversion engine, which receives formatted input records from an input record generating device, converts the records into a different (universal) format in real time and, depending upon the output host device(s), into an output specific format and transmits the converted records to the output host device(s). Messages, i.e., information, from output host device(s) can also be transferred, via the conversion device, to the input record generating devices. By rapidly processing new and/or incompatible record formats, the invention minimizes the cost of maintaining information management systems and maximizes their usage. The conversion device input and output architecture is flexible and the conversion device can be used with multiple (networked or non-networked) input record generating devices and single or multiple record storage devices using multiple record output formats.

43 Claims, 17 Drawing Sheets

METHOD AND APPARATUS FOR RATIONALIZING DIFFERENT DATA FORMATS IN A DATA MANAGEMENT SYSTEM

FIELD OF THE INVENTION

The present invention is a continuation-in-part of application Ser. No. 08/639,073 filed Apr. 24, 1996, U.S. Pat. No. 5,845,283 and relates to a method and apparatus for rationalizing and/or routing data records sent from various generating devices and/or devices using diverse data record formats, protocols and the like, and destined for further devices and further processing. More specifically, the present invention relates to a method and apparatus for eliminating the need to modify a data record processing system each time a new record input device, record file, or data record processing method is introduced. Still more specifically, the present invention relates to a method and device for generating desired data record outputs in a desired format irrespective of the format or protocols of the data record input device used.

BACKGROUND

The complexity and effort required to manipulate the variety of unique records generated by present record generating devices has caused information system developers to develop unique (in the sense of customized) information systems and processes for each data record source. Current information gathering and processing systems, for example telecommunications information support systems, frequently receive data records from several input devices, many of which may use different record formats. In order to be able to manipulate the data in the records from these diverse sources, this information processing environment requires that a custom interface exist between each data record generating device and the data processing system. FIG. 1 depicts a typical current operating environment for an exemplary telecom billing system.

In the example illustrated in FIG. 1 each input device or data generator 12, 14, 16, 18 requires a custom interface 12', 14', 16', 18' respectively to input the data records it generates to a host computer 20 for processing. Similarly the host computer requires a custom interface 12', 14', 16' and 18' respectively for accepting data from each of the data generating devices. These are not trivial interfaces to design and implement and especially on the host computer side of the system, may represent a significant resource allocation. In the telecom example, assume that a telecom customer initially subscribes only to telephone service. Each transaction event, i.e. telephone call, triggers a data record reflecting that transaction in a specified format to be processed. If, over time, that customer adds cable TV to its service, a new and usually differently formatted stream of data records is generated each time a transaction event occurs. If still later, that customer adds a pager and a fax machine to its service, additional new and again differently formatted data record streams are generated for each transaction originating from those sources. All of these situations create potential problems of communication and data/record interoperability between the record input device and the information processing system.

It is also known from U.S. Pat. No. 5,497,491 to provide object i.e. data structure, oriented computing environments in which data is imported or exported using a common external interface for data structures within a data structure oriented environment by encapsulating the data using a "tagging" scheme in order to obviate the need for separate interfaces in order to communicate between the object oriented computing environment and other, external computing environment. This technique does not generally involve the use logical conversion or validation operations.

The invention of U.S. Pat. No. 5,497,491 is directed to a method of simplifying coding, i.e. software for mapping pairs of objects defined at program generation. As such, it is directed to the data processor side of a prior art system such as that described above.

Vendor generated problems, i.e., communications (or network) interoperability, are usually addressed by means of a network protocol convertor or by open standards. However, (again reverting to the telecom example) each time a new device or service is added (e.g., caller ID, call waiting, voice mail), a new, usually custom designed data/record format interface must also be designed in order to support that device or service. As more new telecom services, such as multiway pagers, home (electronic) banking, personal (Internet) home pages, and E-mail proliferate, and as industries such as the telecom industry experience consolidation and deregulation events where different corporate entities using different transaction data record formats or protocols merge and/or acquire each other, the problem of rationalizing record collection and data processing will, based on current technology, become more complex and severe.

The standard conventional solution, that of modifying or recreating an entire accounting or billing system to support that new service or device or creating a patchwork of customized data record formats become less tenable and less satisfactory as options. Also, for specialized data record streams (such as corporate transactions) industry wide standards are not a viable option as data record structures are often a vital part of a company's proprietary data processing operations.

OBJECTS AND SUMMARY OF THE INVENTION

It is an object of the present invention to provide a method and apparatus for converting data records from one format into a desired format regardless of the format in which it was generated.

It is a further object of the invention to provide a method and apparatus for converting one or more input record formats into a common, universal format.

It is yet a further object of the invention to provide a method and apparatus for converting records from a universal format to one or more predetermined output formats.

It is yet a further object of the invention to provide a method and apparatus compatible with existing records processing systems to "translate" between multiple record formats.

It is still a further object of the invention to provide a method and apparatus which can be readily integrated into existing data processing systems and which can instantly adopt such systems to process and output appropriately formatted records as new products and/or services are introduced.

It is yet a further object of the invention to provide a method and apparatus for executing communication protocols between a record generator and host computer which processes the records, and in which the apparatus may be deployed centrally (i.e., at the host computer) or remotely (i.e., at the record generator).

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

To achieve the foregoing and other objects and in accordance with the purpose of the invention, as embodied and broadly described herein, the method and apparatus of this invention may comprise an information retrieval and transit storage system which comprises: input record generating device(s) for generating data records of a predetermined format(s); a transaction engine for receiving records from the input record generating device(s), converting the data records into a universal format, and from the universal format into a predetermined output format(s); and an output host device(s) for receiving records in the predetermined output format(s). The system preferably includes a plurality of input record generating devices, each connected to the transaction engine; the plurality of input record generating devices may be either networked or stand alone. The transaction engine preferably comprises at least two input interfaces, each supporting a different predetermined input record format and each being operable to convert the input records into a universal format. The transaction engine will preferably further comprises at least one output interface operable to convert records from the universal format into a predetermined output format(s).

In another aspect of the invention, there is provided a transaction engine for receiving data records in different formats from a plurality of input record generating devices. The transaction comprises at least one input interface for receiving incoming data records, the input interface supporting a predetermined input format; a conversion device for receiving input records from the input interface and converting the records into a predetermined universal format; and at least one output interface for receiving a record(s) in the universal format and forwarding it in a predetermined output format(s). The conversion device preferably operates in real-time and preferably includes a first storage device for temporary storage of records during conversion and a library of conversion rules for converting data records from one or more input formats into the universal format and from the universal format into one or more output formats.

In yet another aspect, the invention comprises a method of processing records from one or more input formats into one or more output formats using a conversion device, the method comprises the steps of: receiving records organized in a first format; converting the records in a first interface device into a universal format: converting the records in a second interface device from the universal format into a desired output format; and transmitting the records in the output format to an output host device, e.g., a data processing computer.

BRIEF DESCRIPTION OF THE DRAWINGS

The accompanying drawings, which are incorporated in and form a part of the specification, illustrate the presently preferred embodiments of the present invention, and, together with the description, serve to explain the principles of the invention. In the drawings.

DETAILED DESCRIPTION OF THE INVENTION

Figure 1:
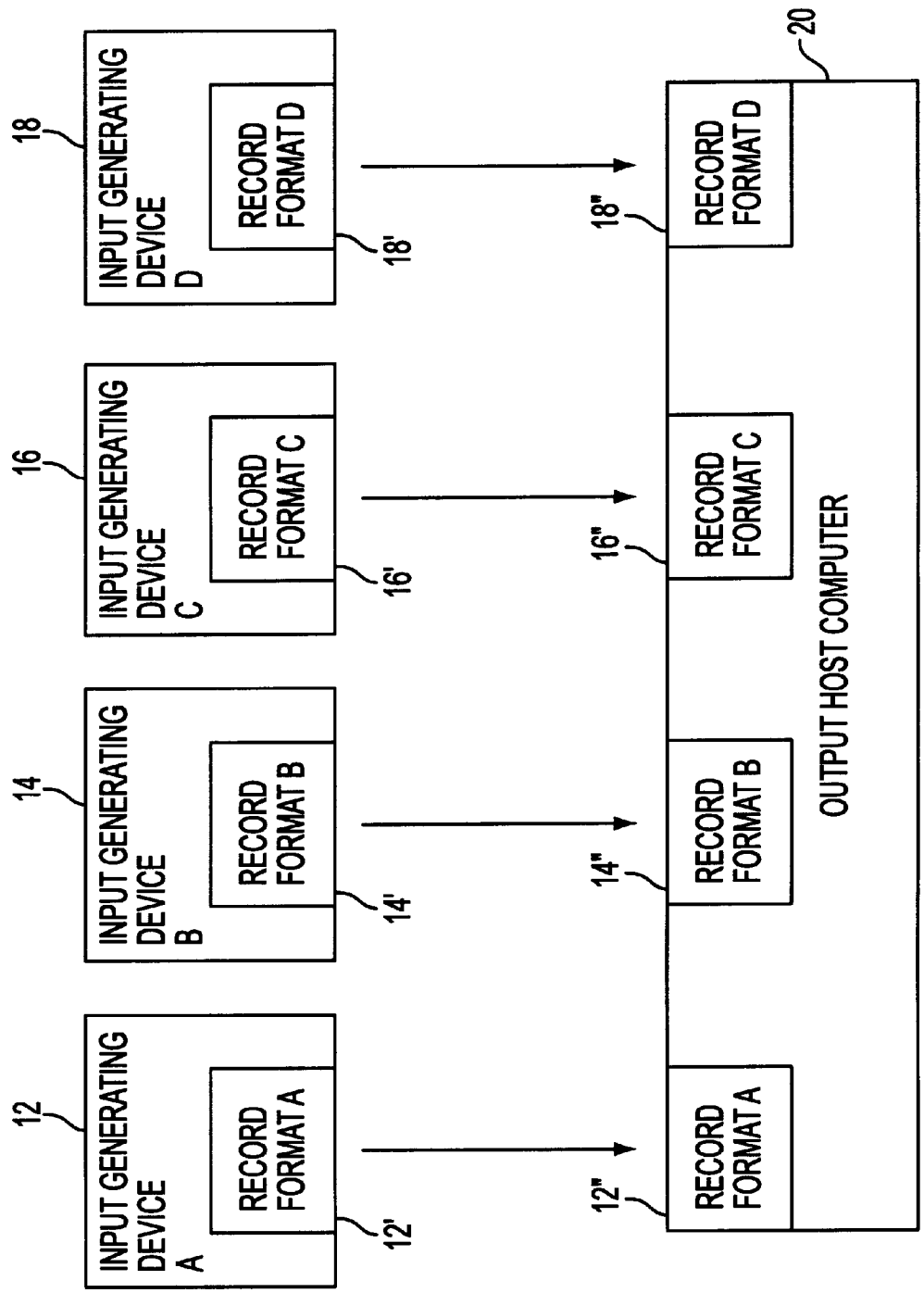
FIG. 1 is a depiction of a prior art data management system utilizing custom designed interface devices for each type of input record generating device used.

Reference will now be made in detail to the presently preferred embodiments of the invention, examples of which are illustrated in the accompanying drawings. In the various drawings, the same reference numerals have been used to refer to corresponding devices or elements.

Turning first to FIG. 1, in a typical prior art business system, such as that illustrated in FIG. 1, records may be received from several different input devices, for example a cellular telephone, 12, a cable TV, 14, a modem, 16, and facsimile machine, 18, each of which generates data records in a different format. As will be apparent to the artisan, the generating devices may also be various point of sale terminals or virtually any type of device which generates a stream of data records for further processing. In such an environment, specially designed, custom interface devices 12', 14', 16' and 18' must be created for communication between the respective generating devices, 12, 14, 16 and 18 and a host device 20, typically a data processing host computer where data records are processed. Similarly the host device is provided with interfaces 12', 14', 16' and 18' respectively for receiving record streams from each of the input devices. The need for custom interface devices not only increases cost and decreases efficiency, it results in the need to constantly redesign record formats, and design new custom interfaces, i.e., as new services are offered by the business involved or new record formats are introduced. Developing record formats and custom interfaces frequently requires allocation of significant resources and may also result in significant delays as new services and/or formats are introduced.

Figure 2A:
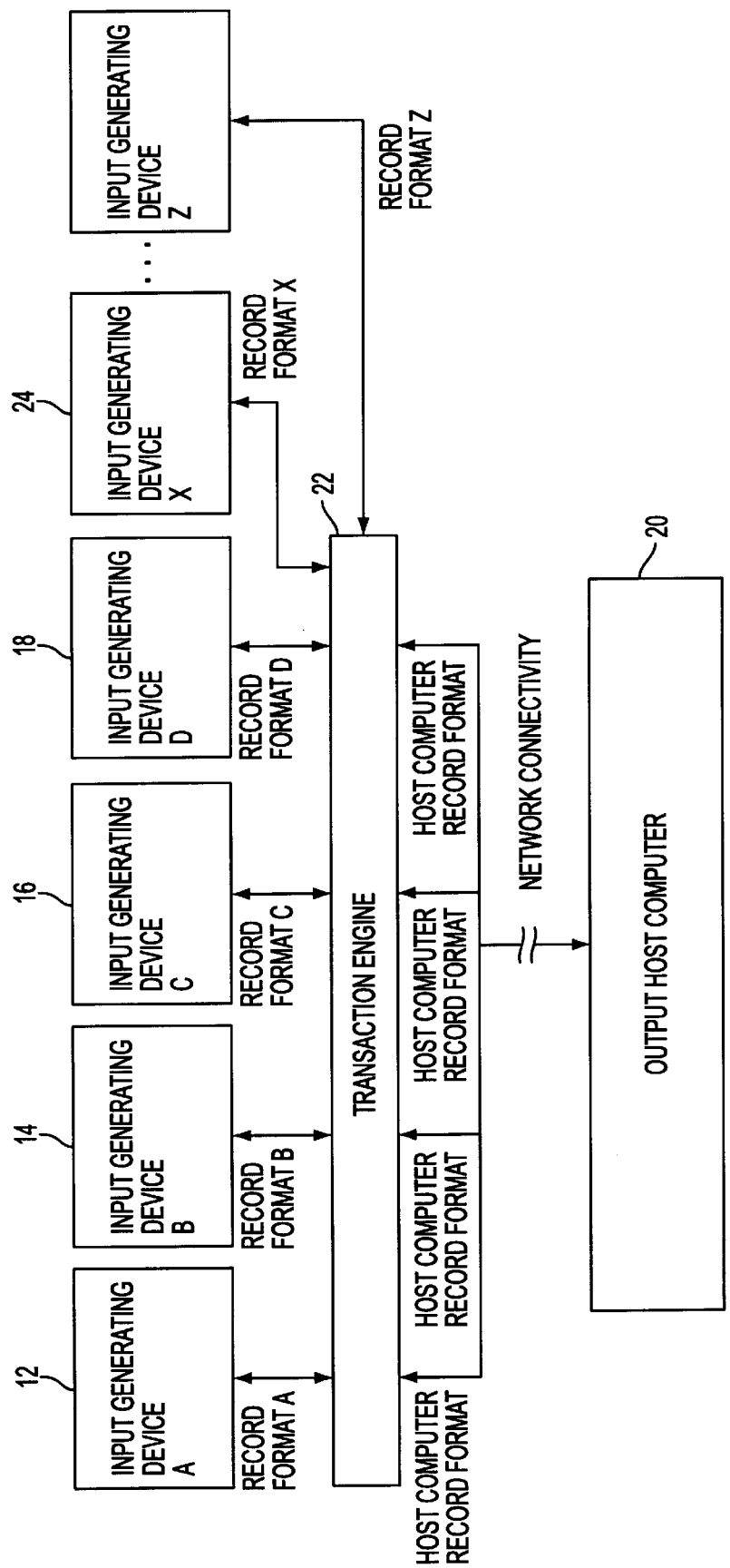
FIG. 2A is a depiction of a record management system incorporating a transaction engine according to the present invention for each input record generating device.

FIG. 2A depicts an exemplary system according to the present invention in which, like the system of FIG. 1, data in different record formats is generated by several different generating devices, 12, 14, 16 and 18. However, the system of FIG. 2A uses a conversion device in the form of a transaction engine 22 according to the present invention which eliminates the need to modify the system each time a new record generating device, service or the like which uses a new or different data record format is introduced. In the system of FIG. 2A, the transaction engine 22 receives formatted data records from an input record generating device and ultimately converts those records into a desired format which may then be transmitted or otherwise distributed to the output host device(s) 20 and/or 20' for processing. Businesses such as those specializing in global telecommunications, credit card processing, electric utility service, and cable television can advantageously use a transaction engine 22 based system to quickly accommodate new business services. By rapidly, i.e. essentially instantaneously, processing new or incompatible transaction record formats, the transaction engine 22 minimizes the cost of maintaining existing business systems while maximizing the effective usage of those systems.

FIG. 2A is an example of a system in which the transaction engine device 22 is deployed remotely, i.e., at the record generator, or in proximity to two or more record generators. The transaction engine 22 may be connected directly to the output host device or may be connected by a network.

Figure 2B:
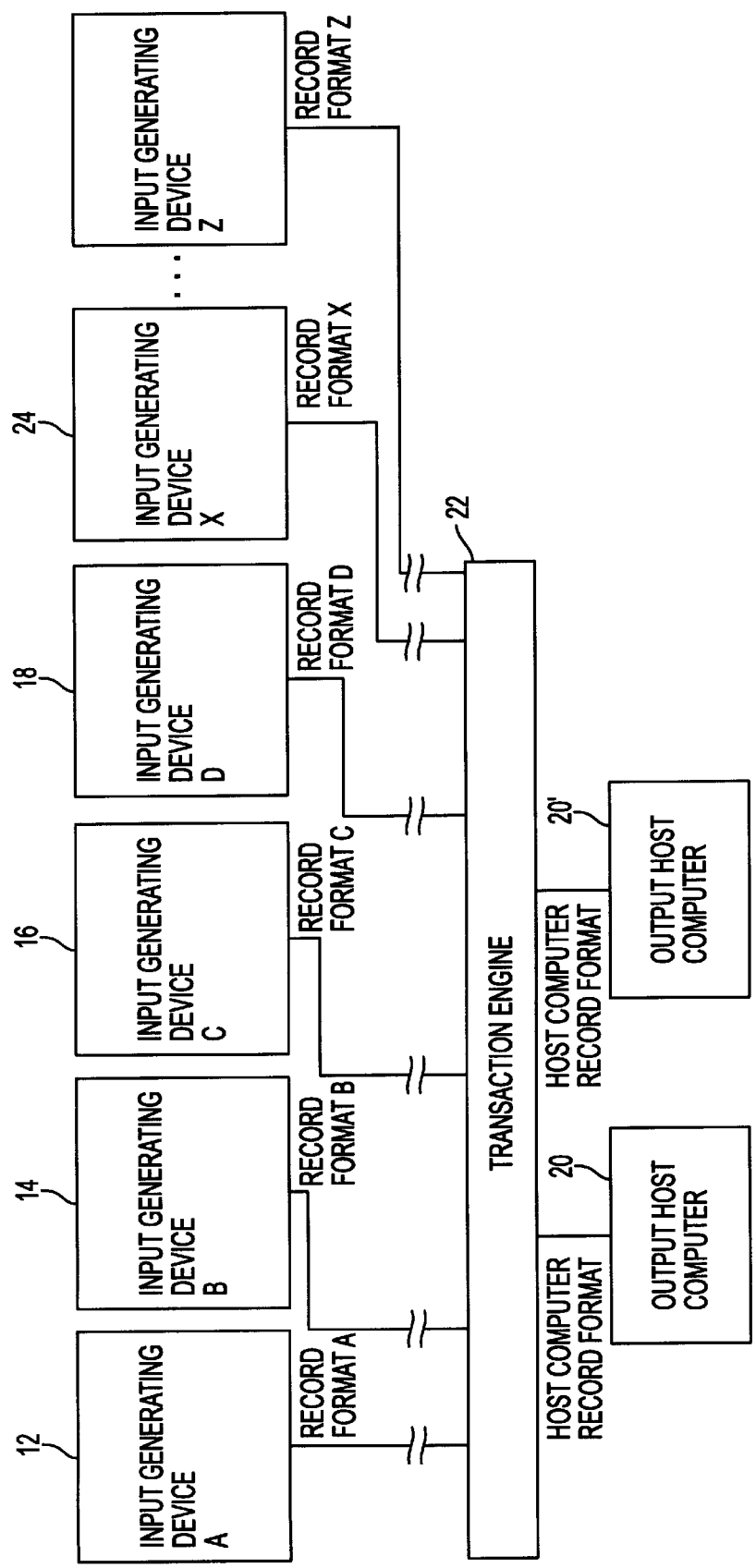
FIG. 2B is a depiction of a management system incorporating a common transaction engine according to the present invention for a plurality of record host devices.
Figure 2C:
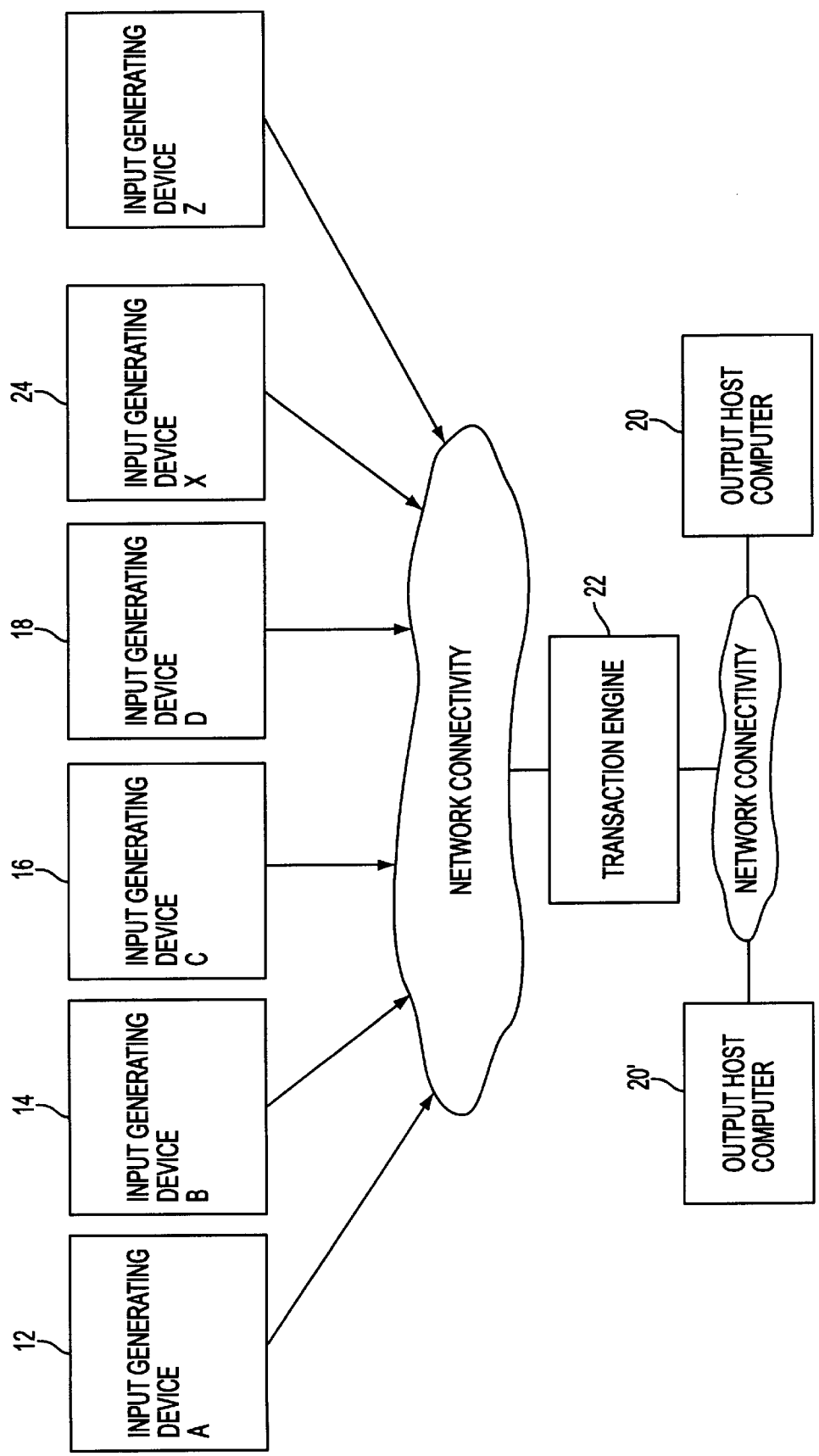
FIG. 2C is a depiction of a record management system incorporation a transaction engine connected to a plurality of data generating devices via a network and to a plurality of record host devices via a network.

Alternatively, as illustrated in FIG. 2B, the input transaction engine 22 may be centrally deployed, i.e., at or in the vicinity of the output host device 20. In the case of FIG. 2B, the record generating devices are connected directly to the transaction engine 22. Alternatively, as illustrated in FIG. 2C, the input record generating devices may be so connected via a network N1 and the host devices 20 and 20' may be connected to the transaction engine 22 via a network, N2.

Figure 3A:
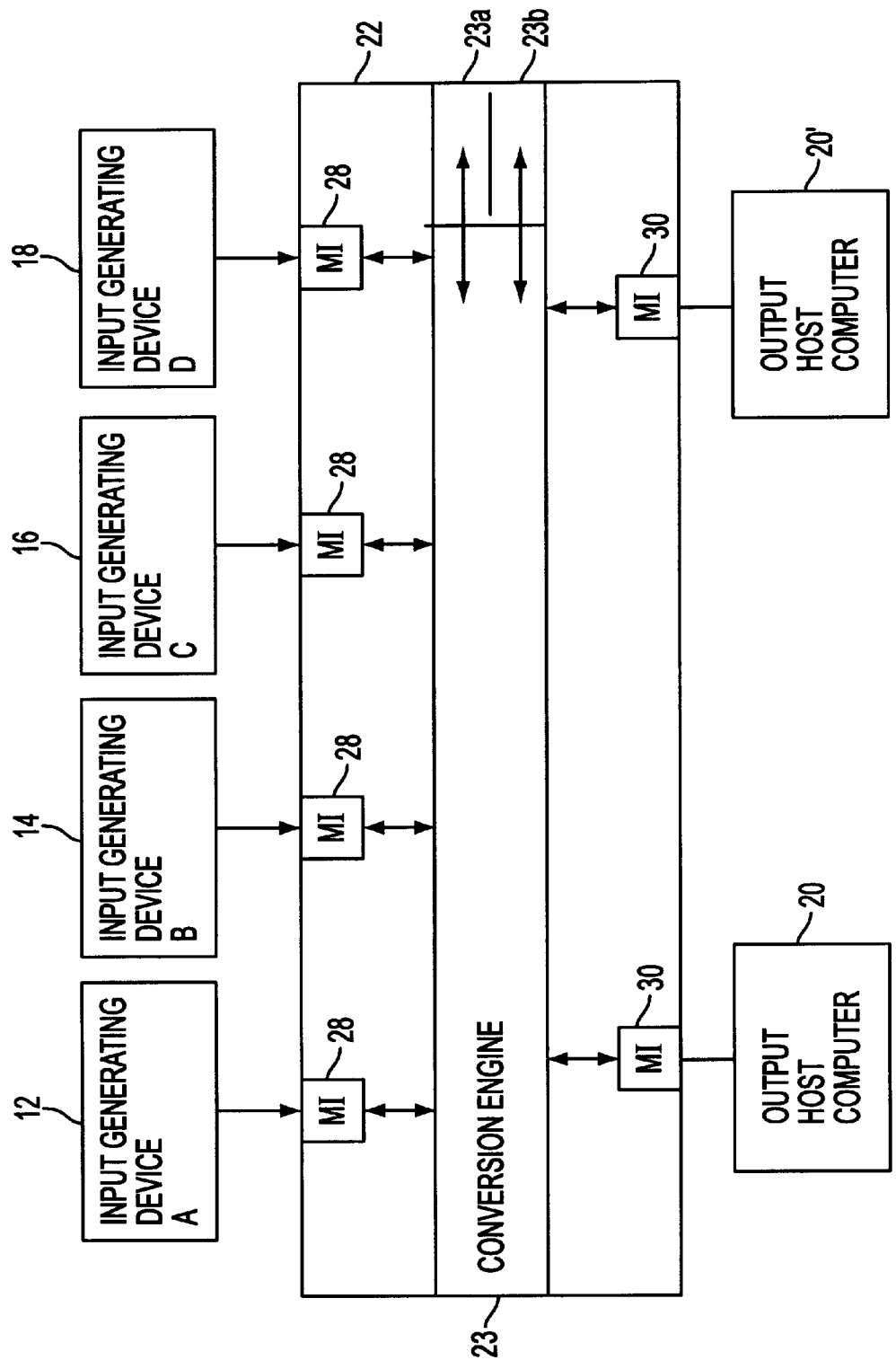
FIG. 3A is a schematic depiction of the architecture of an exemplary transaction engine in simplified form for ease of explanation and illustration.

As best seen in FIG. 3A, the transaction engine 22 uses a unique message interface (MI) to process each supported record format. In a preferred implementation, when the transaction engine 22 receives a record, it will, as described in more detail below, control the appropriate MI by means of the conversion engine 23, which is preferably embedded in the transaction engine 22, to "translate" the record from the input format to a desired Universal Data Format (UDF), which may be an industry specific format. As described in more detail below with reference to FIG. 3B, the conversion engine 23, preferably includes a super-record storage 23b for holding records during the conversion processes and, a library storage 23a for storage of the record conversion rules applicable to the various message interface devices. More specifically, it is the library 23a which contains the conversion rules applicable to the field of the UDF.

When a conversion from an input format to UDF is complete, the conversion engine 23 passes control to an output MI 30 that again uses the conversion engine 23 to translate the record from the UDF to a specified output record format. As explained in more detail below, the conversion engine 23 uses separate conversion rules to translate a record from the input format to the UDF and from the UDF to the output format.

As will be understood by one of skill in the art, the conversion engine 23, which is preferably software driven, may operate using any appropriate operating system although the UNIX™ operating system and Sun® platform, such as for example a platform using a Sun® chip set, UltraSPARC™, are presently preferred.

As alluded to above, the input generating devices may be stand alone devices, nodes of a networked system or some combination of both. Although physical network interface specifications may vary from application to application, it is presently preferred that each transaction engine 22 should preferably support a plurality of interfaces such as the V.3X-type, 10BaseT, FDDI, or RJ-11/45 interfaces. The conversion engine 23 should preferably also support all major communication protocols such as for example the TCP/IP protocol suite, or the IBM® SNA™ protocol suite.

Figure 3B:
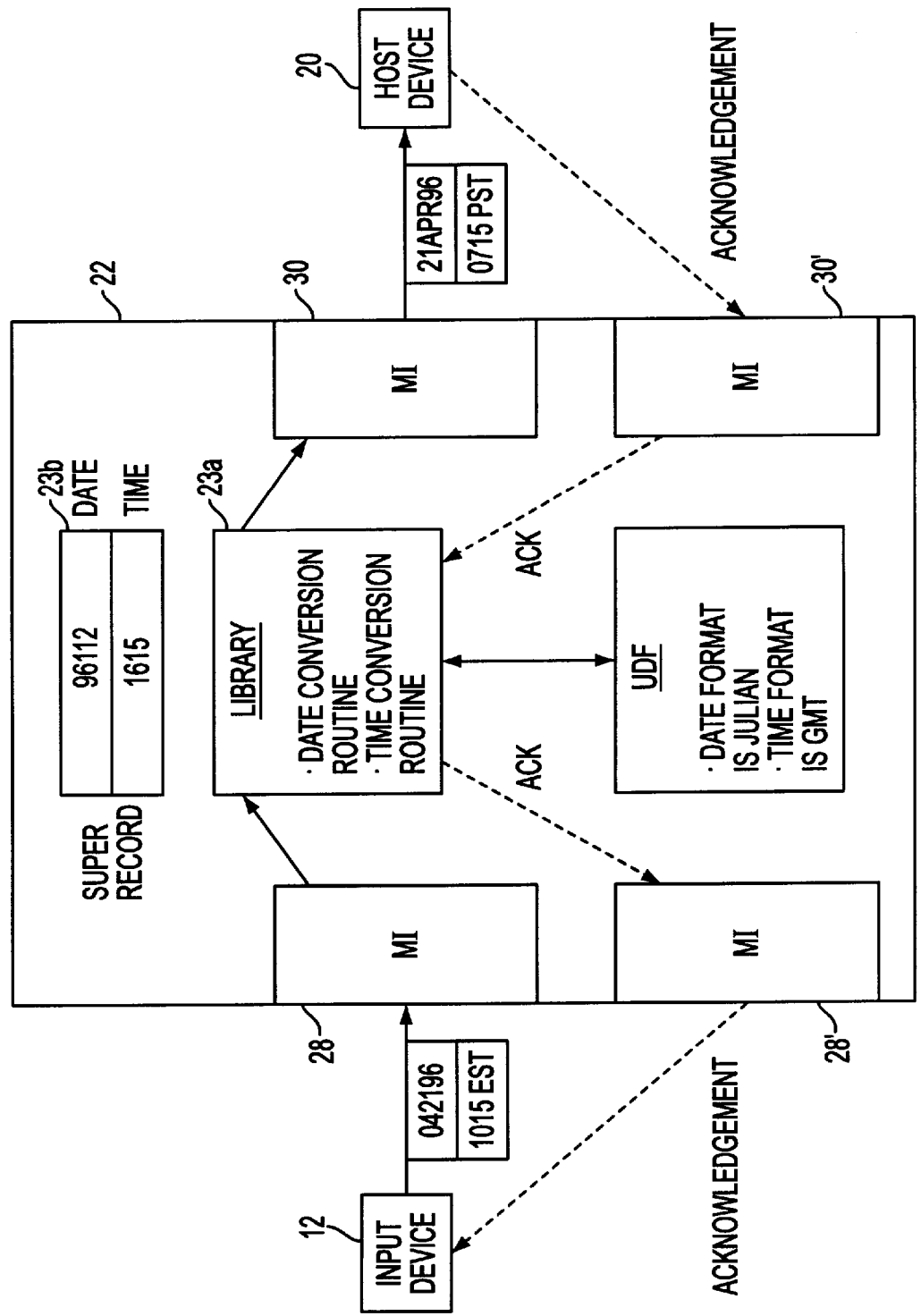
FIG. 3B is a depiction of the relationship between the input and output interface of the transaction engine of FIG. 3A, for explaining the relationship between the input and output interfaces and the library and super-record of the transaction engine.

Referring now to FIG. 3B, in order to make the transaction engine 22 as flexible as possible, i.e., so as to meet the record conversion needs of as many applications and industries as possible, the method and device for converting or processing records between input and output devices must also be flexible. This is especially important where the number and types of input/output devices is likely to be significant.

This flexibility is preferably accomplished by utilizing multiple logical message interfaces (MI's), 28 and 30, which may easily be installed and supported in the transaction engine. For ease of explanation, only a single such input interface 28 and output interface 30 are depicted in FIG. 3B. Each logical message interface 28 and 30 will be unique to a record type to be input to or output from the conversion engine 23. Using different logical message interfaces for different record types allows a user to use only the interface(s) necessary to support a specific application.

All records input into the conversion engine 23 are converted into a format specific or "known" to the transaction engine i.e., the UDF. By converting all records into a specific format, a variety of different inputs and output devices can be installed, added, or deleted, without impacting the basic conversion functions of the transaction engine.

The data records received are temporarily stored in the super-record portion 23b of the conversion engine 23 for subsequent conversion to an output record.

All records to be output from the conversion engine 23 are first converted from the same "known" format i.e., the UDF to a desired output format. Again, by using a known format as the basis of conversion, different and multiple output record formats can be supported regardless of how the input record was formatted.

As further explained below, the conversion engine 23 processes records and/or messages bi-directionally so in addition to processing input records, application controls, e.g. acknowledgements, retransmission requests, flow control commands back to the generating devices 12 from the host device 20 may also be processed.

A library 23a supports conversion routines used to process either from an input record format to the universal format or from the universal format to the output format. By using a separate specialized processor for the conversion routines and by storing the conversion routines in the library, records will be processed most efficiently since only the conversions required will be performed, and the addition and deletion of conversion routines is readily accomplished without impacting the entire transaction engine system.

As explained above, the interface that defines the type of record that will either be sent to or sent from the conversion engine 23 is the message interface (MI). The MI not only defines the type of input or output data being handled, it also establishes the conversion rules for a specific type of record, and the application controls that will be applied to the input or output records and/or messages.

The UDF is the definition of all fields supported within a specific conversion engine. For example, as illustrated in FIG. 3B a UDF may contain a date field that, by definition, always uses a Julian Date format. Received records that contain date fields may use a different format (e.g., MMDDYY), which are always converted into a Julian Date. Output records may also require a date field in a different format (e.g. DDMMYY), but the date would always be converted from a Julian Date format.

As alluded to above, the record that is temporarily stored in the transaction engine (before it is converted to an output record) is referred to as a "super-record" and is stored in the super-record 23b in FIG. 3B. This aspect of the conversion device will be further discussed below in connections with FIGS. 9A, 9B, 11A and 11B. The super-record is comprised data fields in a format that is defined by the UDF.

Examples of conversion routines which may be found in the library 23a are an ASCII-to-EBCDIC routine, or a date conversion routine. For example, in FIG. 3B, a simple record consisting of date field and a time field is illustrated. Further, in the example of FIG. 3B, it is assumed that the input generating device 12 requires an acknowledgement from the output host device 20 that a record has been received before it will send a second record. In such an example, the transaction engine operates as follows:

1) A data record from an input generating device 12 is received by the transaction engine 22. The record is defined as record type (A) based on the physical and logical port through which the record arrived as well as the content of the record itself. The rules for converting the fields within each record are issued by input MI 28.

2) The conversion routine library 23a is then called on to convert a date field and a time field. The routines in the library 23a will convert the date field and time field to the UDF format.

3) Using the definitions provided by the UDF, the date and time field are converted into and temporarily stored in the super-record 23b.

4) Subsequently, an output conversion process is initiated by the output MI 30. The output MI 30 defines the output record type in the illustrated example record type "B" and establishes the rules for converting to that record format.

5) The conversion routine library 23a is called on to make the date field and time field conversion.

6) Using the data record that has been temporarily stored in the super-record 23b, the conversion to the output record format is completed and sent to the host device 20.

7) Once the record is received and the output or host device 20 issues an acknowledgement, i.e., a return or application control, to the MI 30' (which may or may not be the same as the MI 30) that a record was received and that an additional record may be sent.

8) The conversion engine 23 convert(s) the application control and passes it through to the MI 28'. In some instances, the application control record will not require conversion and may be passed directly to the MI 28'. The MI 28' may be the same or a different MI then the MI 28 used to convert the original input record.

9) Once the application control is received by the input device, the process repeats itself.

In contrast to prior processing systems, the transaction engine and data conversion process described above, operates in "real-time," occurring on the order of milliseconds. This enables the present invention to be implemented into virtually any preexisting data record collecting system and data processing system. In that regard, it is noted that system speed may vary and systems operating with process speeds in range of even several seconds or tens of seconds are within the scope of the invention. It is also within the scope of the present invention for certain records to be held or buffered and later dumped to a host device on command (usually an automatically generated timing command).

Table 1 depicts an example of a record format that may be supported by an MI. As explained above, the MI defines the record structure that it recognizes and the conversion rules it uses to transform a record. Typically, an MI will preferably support either input records or output records but not both. Input MI's, 28, (referred to below as "IMI's") transform a data record from the specified input format to the UDF. Output MI's, 30, (referred to below as "OMIs") typically transform a data record from the UDF to a specified output format(s). The MI functions are preferably reversible. For example, in connection with application control messages, e.g., an acknowledgment from a data processing unit to an input device, the MI 30 will operate as an IMI and the MI 28 as an OMI.

In Table 1, to the right of each message interface component is an example detailing typical contents of that message interface component.

TABLE 1

| The Message Interface | | |
|---|---|---|
| The MI Components | | |
| Unique Header | Date and Time Sequence Number | Jan. 01, 1996 : : 083013 015 |

TABLE 1-continued

The Message Interface

| | | |
|---|---|---|
| | Physical/Logical Port | 41 : : L0 |
| | Protocol | SNA |
| | Encryption | None |
| | Compression | LZH |
| Transaction Record Type | TACACS | |
| Transaction Record Sub-Type | 1) IF Data Field 1 = 'A' AND Data Field 4 = 123.345.567.789 THEN use Transaction Record Structure 'A' 2) The value in header field 3 determines the sub-type *** (<n>) <definition rule> | |
| Transaction Record Structure | Data Field 1 : : Integer 8 Bytes Data Field 2 : : ASCII Character 2 Bytes *** Data Field <n> : : <data type> <data size> | |
| Conversion Rules | Data Field → Data Field 3 (Ø) Data Field → Data Field 1 (Julian Date → GMT) *** Data Field <x> → Data Field <y> (<conversion rule>)) | |

The specific components of the message interface of Table 1 will now be further described.

Header

The conversion engine 23 of the transaction engine 22 preferably associates unique information, i.e., a header with each record it receives. This header will not only allow the conversion engine to track each record back to its origin, but also provide useful information for an audit trail. A typical header should preferably contain:

1) The date and time that the conversion device received the record;
2) The physical port of the conversion device that received the record;
3) The logical port associated with the record;
4) The communication protocol used to receive the record;
5) Whether the record is compressed or encrypted and, if so, the method used by the sender of the data.

Record Type

The MI record type preferably identifies the class of records that the MI processes, in this example TACACS. When the conversion engine recognizes an input record format, it routes the record to the appropriate MI for processing.

Record Sub-Type

The MI record sub-type is intended, where appropriate, to apportion the record type into sub-classes. If an MI specification requires record sub-types, the conversion engine 23 will preferably examine the record header to determine the sub-type of the input record.

Record Structure

The record structure defines the length of the record and specifies the field definitions, that is, field length and record type. The conversion engine 23 uses the record structure to properly map and convert the record fields. If the MI specification includes record sub-types, a separate record structure may exist for each sub-type.

Conversion Rules

The conversion rules instruct the conversion engine 23 how to convert a record to the desired universal format and vice versa. As exemplified in Table 1, the conversion rules may instruct the conversion engine 23 to perform tasks such as the following:

(i) Copy field 3 in the input record to field 5 in the UDF record;
(ii) Convert the input record time field from Julian Data to GMT;
(iii) Convert the input record status field from ASCII to binary;
(iv) Perform no conversion In some cases, the conversion engine 23 will receive a compressed input record. In that case, the transaction engine will preferably examine the input record header to determine the compression algorithm and the length of the compressed record; and preferably, industry standard algorithms will be used to decompress an input record before processing and to compress an output record after processing.

In other cases, the transaction engine 22 may receive an encrypted input record. In that example, it will examines the record (and information in the header) to determine such things as the encryption algorithm used and the length of the encrypted record. Assuming the input record uses algorithms known to the transaction engine 22, the input record is decrypted before processing and then encrypted after processing to create the output record. In addition, the transaction engine 22 may participate in various other security architectures under the control of the general data processing system associated with an input device(s) and its companion host devices.

In some cases, input records may use a different character language than the output record(s). In such cases, the transaction engine 22 preferably converts between such characters, such as for example, packed decimal, ASCII, EBCDIC, and binary characters.

Some other useful functions of the transaction engine 22 will now be described.

Padding

Padding a field with blank characters guarantees that the length of the field will remain constant. The conversion engine 23 preferably right hand justifies and/or left hand justifies, as appropriate, using appropriate characters (e.g., zero's for numerical fields and blanks for character fields).

Truncation

Truncation is preferably used to ensure that record mapping does not inadvertently overwrite the contents of any other record fields when copying the contents of a record field.

"No Conversion" Option

The conversion engine 23 preferably recognizes when not to convert a particular field or an entire record. When combined with UDF definitions (which is a form of record mapping), the "no conversion" option creates three situations:

1) Map the record field and convert its contents;
2) Map the record field, but do not change its contents;
3) Do not map and do not change the contents of the record field.

The first two situations address the conversion or non-conversion of specific fields in the input record. In both situations, the transaction engine maps a field from the input record directly to the output record. The transaction engine preferably processes all records that fall into any of these situations. In the last situation, however, the transaction engine is not changing the input record, but is simply passing the input record to the output port. When an input record falls into the last situation, the conversion engine 23 does not convert the input record into the universal format.

The transaction engine provides the ability to redirect the records that IMI 28 receives to the records associated with the selected OMI(s) 30. As described in more detail below, each IMI 28 "listens" to a logical port associated with a physical port for input records in a logical protocol format specified during system configuration. When an IMI 28 receives an input record, it converts the record to the universal format based upon the IMI conversion rules or using calls to the library 23a. Similarly, the OMI conversion rules are used to convert the universal format to the desired output format(s). In this sense, the conversion engine 23 may be envisioned as essentially operating as a "switch" that routes the converted records to the appropriate logical port(s) (and thereby to the physical port(s)) associated with the desired OMI(s).

Figure 8:
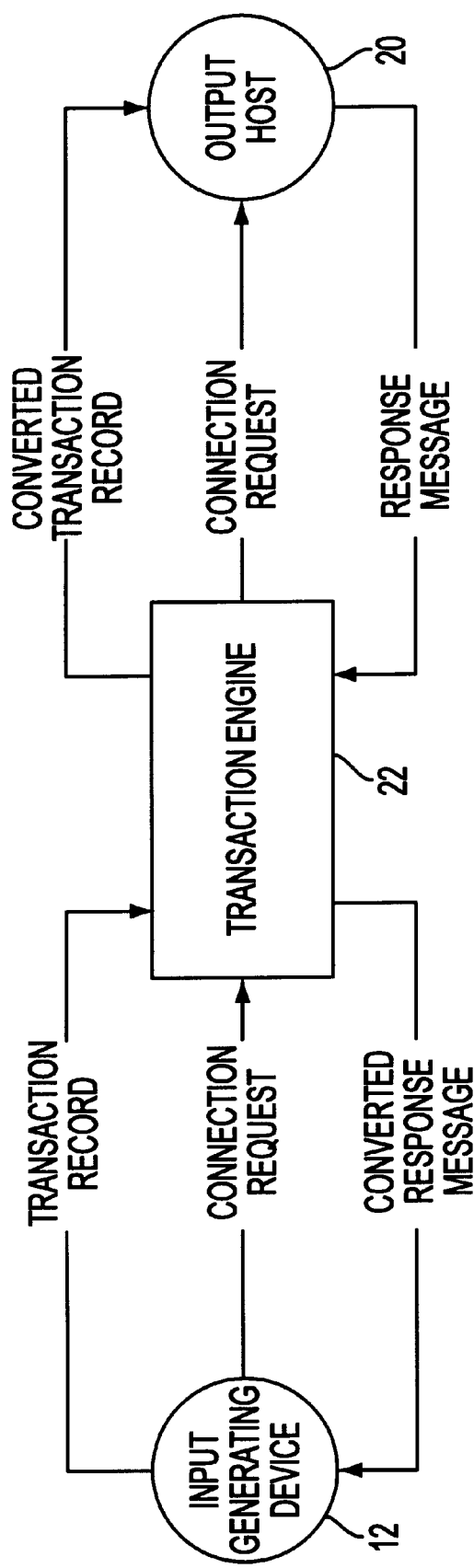
FIG. 8 is a simplified version of FIG. 3B illustrating information flow between an exemplary input record generating device, a transaction engine according to the present invention and an output host device, typically a computer for maintaining a data base.

In the following discussion, the flow of record and requests between the input generating device(s) 12, transaction engine 22 and output host 20 will be more fully explained in connection with a preferred embodiment depicted in FIGS. 8, 9A, 9B, 10A, 10B, 11A and 11B. Turning first to FIG. 8, a simplified system having one input generating device and one output host device is depicted for the purposes of simplifying the explanation of how records and messages flow within the system. After the input generating device 12 establishes a connection to the transaction engine 22, the transaction engine is able to receive data records from the input generating device. As alluded to above, the transaction engine 22 passes each data record that it receives through a series of processes that convert it from a known but arbitrary input format to a desired output format. Upon completion of the conversion process, the transaction engine 22 establishes a connection to the output host device 20 and sends the data record, in the desired output format, to the host device.

In addition to processing data records sent from the input generating device 12 to the output host device 20, the transaction engine 22 also processes response messages, i.e. control applications, from the output host device 20 to the transaction engine 22 and/or to the input generating device 12. In that regard, the transaction engine 22 preferably accommodates the following scenarios:

1. no response messages;
2. ignore response messages;
3. process response messages.

In the first scenario, the transaction engine 22 configuration does not provide for response messages transmitted from the output host device 20. After the converted transaction record is sent to the output host device 20, either the processing of that data record is complete or the processor can generate its own response to the input device. In the second and third scenarios, the configuration expects, for each data record, that the output host device 20 will send a response message to the transaction engine 22. In the second scenario, the transaction engine 22 will accept a response message from the output host device 20, but will not pass that message along to the input generating device 12. The third scenario accepts a response message from the output host device 20 and processes that message in a manner similar to an incoming conversion process applied to the input data record.

The data flow for a typical input data record from a record generating device will now be discussed in connection with FIG. 9A. The transaction engine 22 can be considered as comprising a series of transaction processors, TP1–TP6, some of which interface with the IMI's 28 (also see FIG. 3B), i.e., TP1 to TP4, for receiving and/or sending records/messages from/to an input generating device(s) 12 and some of which interface with an OMI 30 (also see FIG. 3B) i.e., TP5 and TP6, for sending and/or receiving data records/messages to/from an output host device 20. Each of the transaction processors (TPs) will preferably interface with either an input record generating device 12 or an output host device 20 (see FIG. 3B). The transaction processors TP1 to TP4 that interface with the input record generating device(s) "listen" for a connection request. As soon as a connection is established to an associated transaction processor (TP) the transaction processor is available to process transaction records from the input generating device. When one of the transaction processors receives a transaction record, it copies that record to a shared memory 42. The transaction processors TP1 to TP4 access IMIs 28 and the transaction processors TP5 and TP6 access an OMI 30 each of which is executed using an associated dynamic link library ("DLL") 46. From the DLL 46 the transaction processor obtains information about a transaction record such as:

transaction record type;
transaction record length.

The transaction processors TP1–TP4 also access the DLL 46 of the IMIs 28 to convert that transaction record. The DLL 46 of the IMIs 28 applies a set of conversion functions—for example, converting time field in the data record from Greenwich Mean Time (GMT) to unix time t—to the transaction record data to translate it from one format to another. The transaction processors also manage the following data format conversions:

input data format to the UDF (TP1–TP4);
UDF to the output data format (TP5 and TP6).

When the data conversions are complete, an input side transaction processor executes a move signal which transfers the converted record to the appropriate output side transaction processor that issues a connection request to the output host device and subsequently transmits the converted transaction record thereto.

The shared memory 42 will vary the number of memory buffers 46 so as to "tune" overall system performance. Each available buffer 46 will contain several slots that track a data record conversion by providing a snapshot of the data at various points in the conversion process. When a transaction processor receives a data record, it copies the data in the record to the first buffer slot. After converting from the generating device format to UDF, the first buffer slot will contain the original data record and the second buffer slot will contain the UDF representation of that record. Similarly, after converting from the UDF to the output host device format, the second buffer slot will contain the UDF representation of the original data record and the third buffer slot will contain data in the output host device format. In addition, as alluded to above in the discussion of FIG. 3B, the shared memory 42 contains status information associated with the conversion process buffers 46 including the conversion mapping information, MI definitions, and the structure of the UDF.

The transaction processors examine the contents of the conversion mapping file and the MI definition file in a shared memory 42 to determine the protocol for processing a particular transaction record and/or message. In every case, the input record generating device needs to establish a connection to the transaction engine 22. The transaction engine 22, in turn, must establish a connection with an output host device. An OMI definition file provides the address information for making the connection to the output host device. A conversion mapping file 50 also tells the appropriate transaction processor how to make the connection to the output host device. The conversion mapping file 50 tells the transaction processor how to process specific types of messages from the output host device. A data stream of messages may include several different types of messages. The conversion mapping file will tell the transaction processor whether it needs to convert a particular type of message, whether it can ignore a particular type of message, and, if it does need to convert that message, whether the message can be ignored, and if the message is to be stored, where it needs to store it once processing is complete. The MI definition 48 file in the shared memory 42 will also tell the transaction processor whether it should expect a response message from the output host device. If it does expect a response message from the output host device, the MI definition file 48 in the shared memory 42 will also tell the transaction processor whether the input record generating device needs to see that response message. If the input record generating device is not interested in seeing that message, the transaction engine 22 will simply discard any response messages from the output host.

Figure 9A:
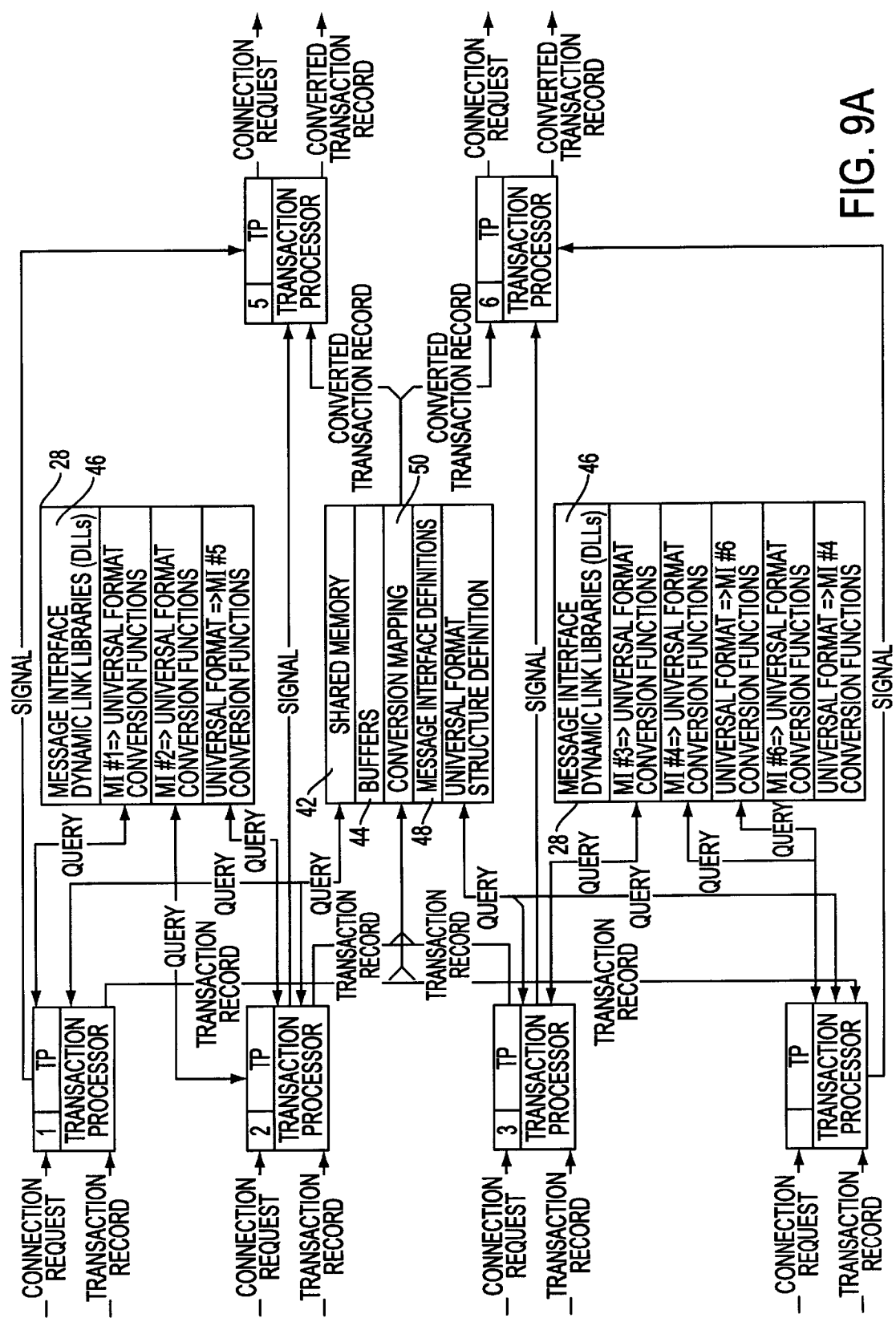
FIG. 9A is a flow diagram illustrating the transaction processor control over the flow of messages and records from a generating device to the transaction engine of FIG. 8 during a transaction for exemplary types of transactions.
Figure 9B:
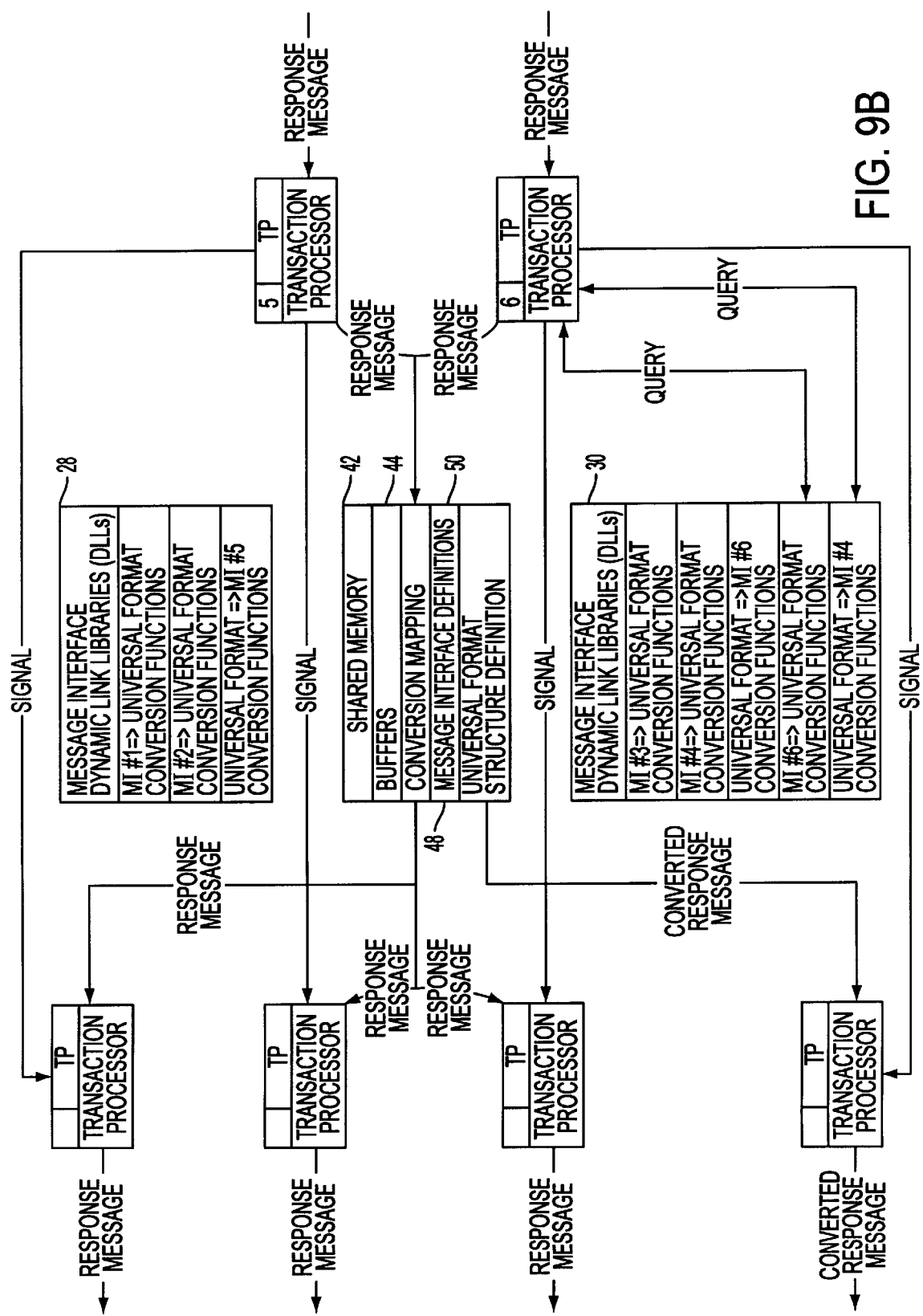
FIG. 9B is a flow diagram illustrating the flow of response messages from the transaction engine to an input record generating device in connection with a response message from an output host device(s) provoked by receipt of a converted transaction record.

Referring now to FIG. 9B, the flow of a response message, if any, from an output host device to an input record generating device will be described. As explained above, the transaction engine 22 may be configured to handle response messages from the output host device. When such messages are received, the data flow will follow a path similar to but reversed from that described above in connection with the processing of transaction records as explained above in connection with FIG. 9A. In this scenario, after a transaction processor sends a converted transaction record to its associated output host device, it will wait for a response message from that host device. When and if it receives a response message, the transaction processor (in this case TP5 or TP6) copies that message into the memory buffers 44 of the shared memory 42 and "calls" the Dynamic Link Libraries ("DLLs") 52 of the associated OMI, 30 which in the response mode is functioning as an input MI, (in the described embodiment the MI's are preferably bidirectional) to convert that response message from the response format to the UDF and on the DLL 46 of the associated IMI 28 (which in the response mode is functioning as an output MI) to convert the response message from the UDF to the input generating device record format. After completion of the conversion process, the transaction processor associated with the host device sends a move signal to the transaction processor associated with the input record generating device. This move signal triggers that transaction processor to send the converted response message to the input record generating device.

Figure 10A:
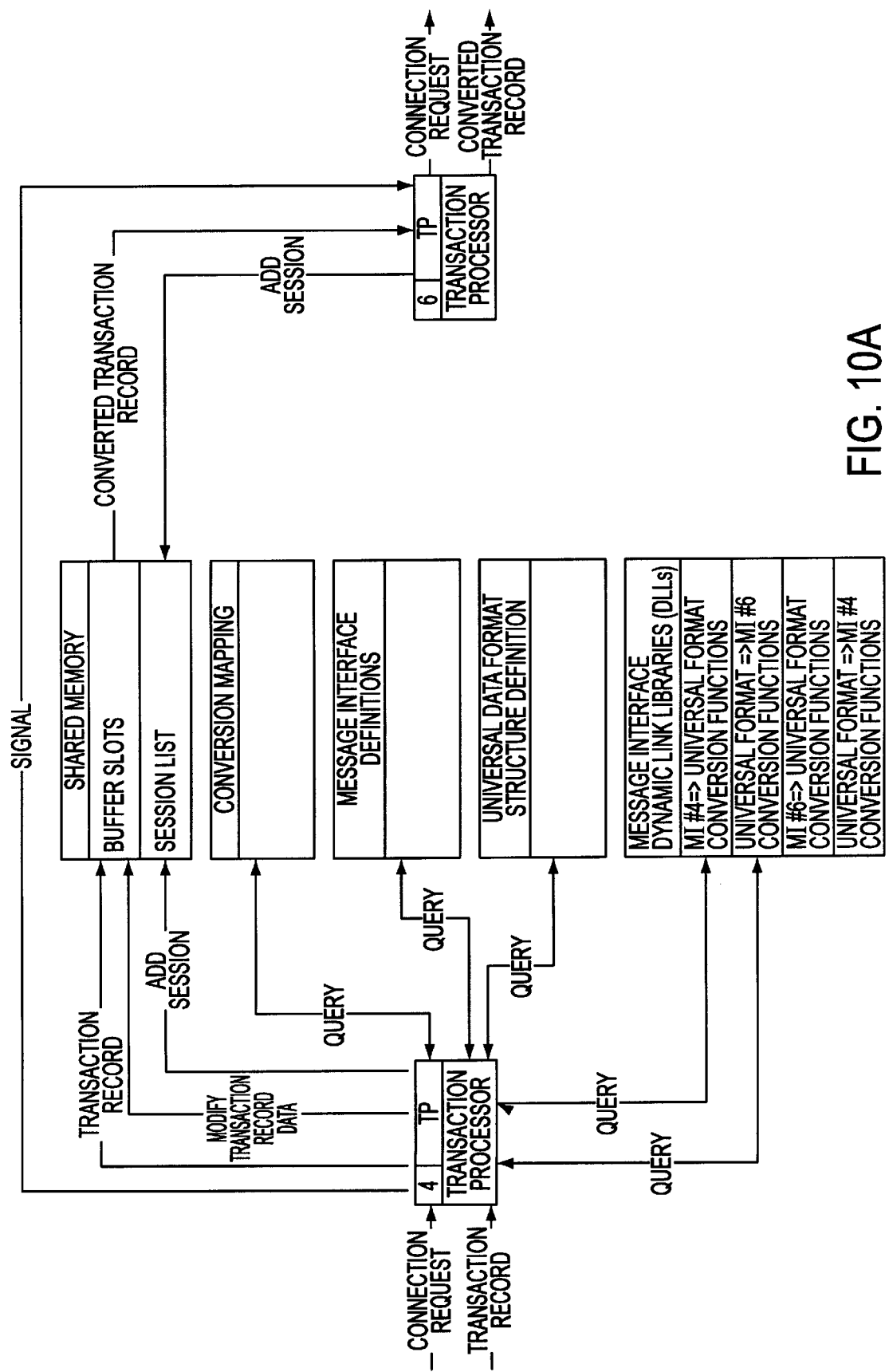
FIG. 10A is a flow diagram illustrating the flow of records/messages between a specific input side transaction processor and output side transaction processor of the transaction engine of FIG. 9A during a transaction.

FIG. 10A is similar to FIG. 9A but has been simplified for ease of understanding to illustrate the flow of a record from an input record generating device associated with a specific transaction processor, TP4, to a single output host associated with a specific transaction processor, TP6. The flow of data in FIG. 10A is essentially the same as that of FIG. 9A except that there are no response messages or signals from the host device back to the input generating device routed through the transaction engine.

Figure 10B:
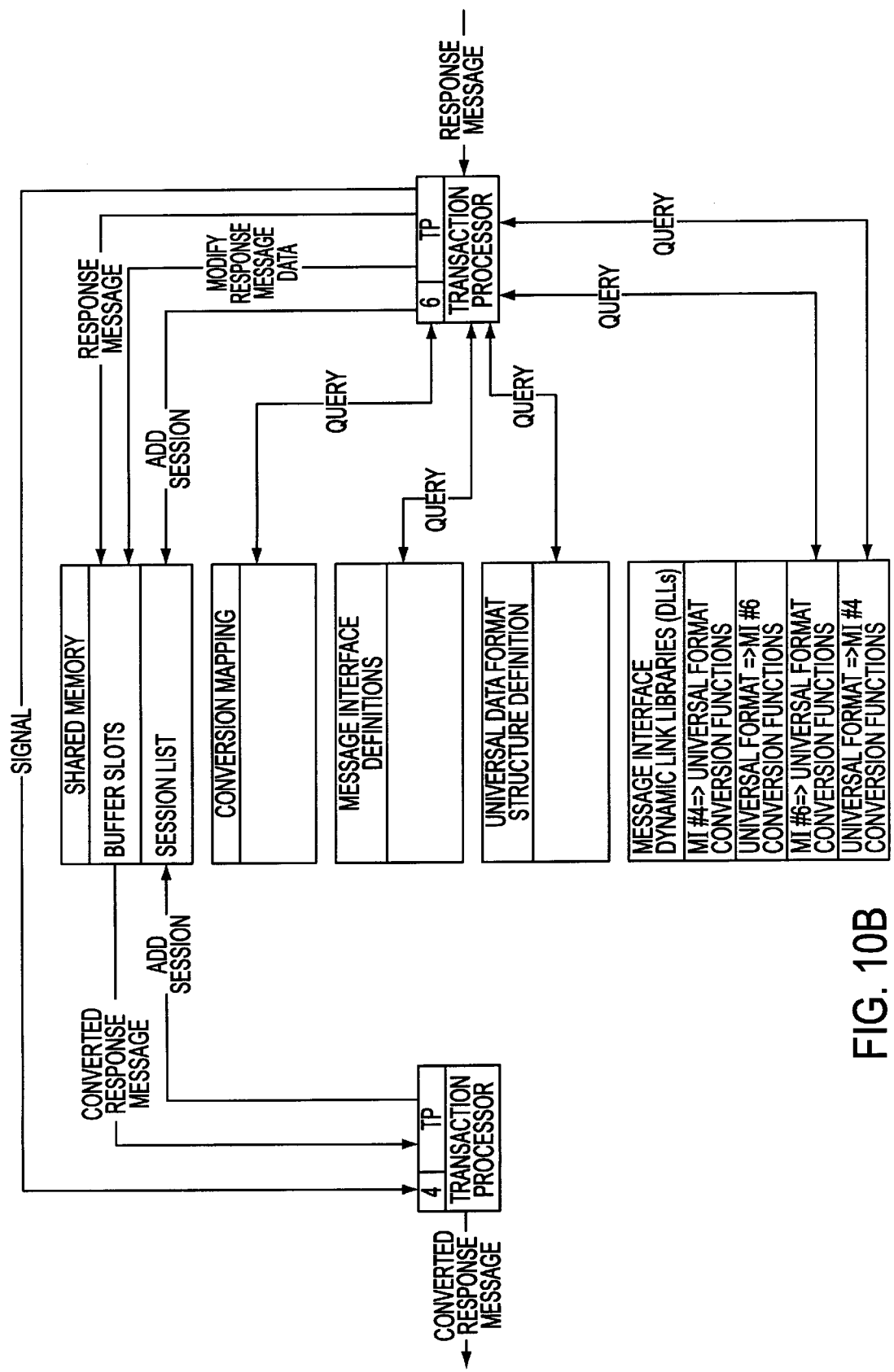
FIG. 10B is a flow diagram illustrating the flow of response data from a specific output side transaction processor to a specific input side transaction processor of the transaction engine of FIG. 9B in connection with a response from a downstream host device to receipt of a converted transaction record.

Similarly, FIG. 10B is similar to FIG. 9B but has been simplified to illustrate the flow of a single response message from an output host device to its associated transaction processor, TP6, and, via the transaction engine, to a specific input record generating device via its associated transaction processor TP4.

Figure 11A:
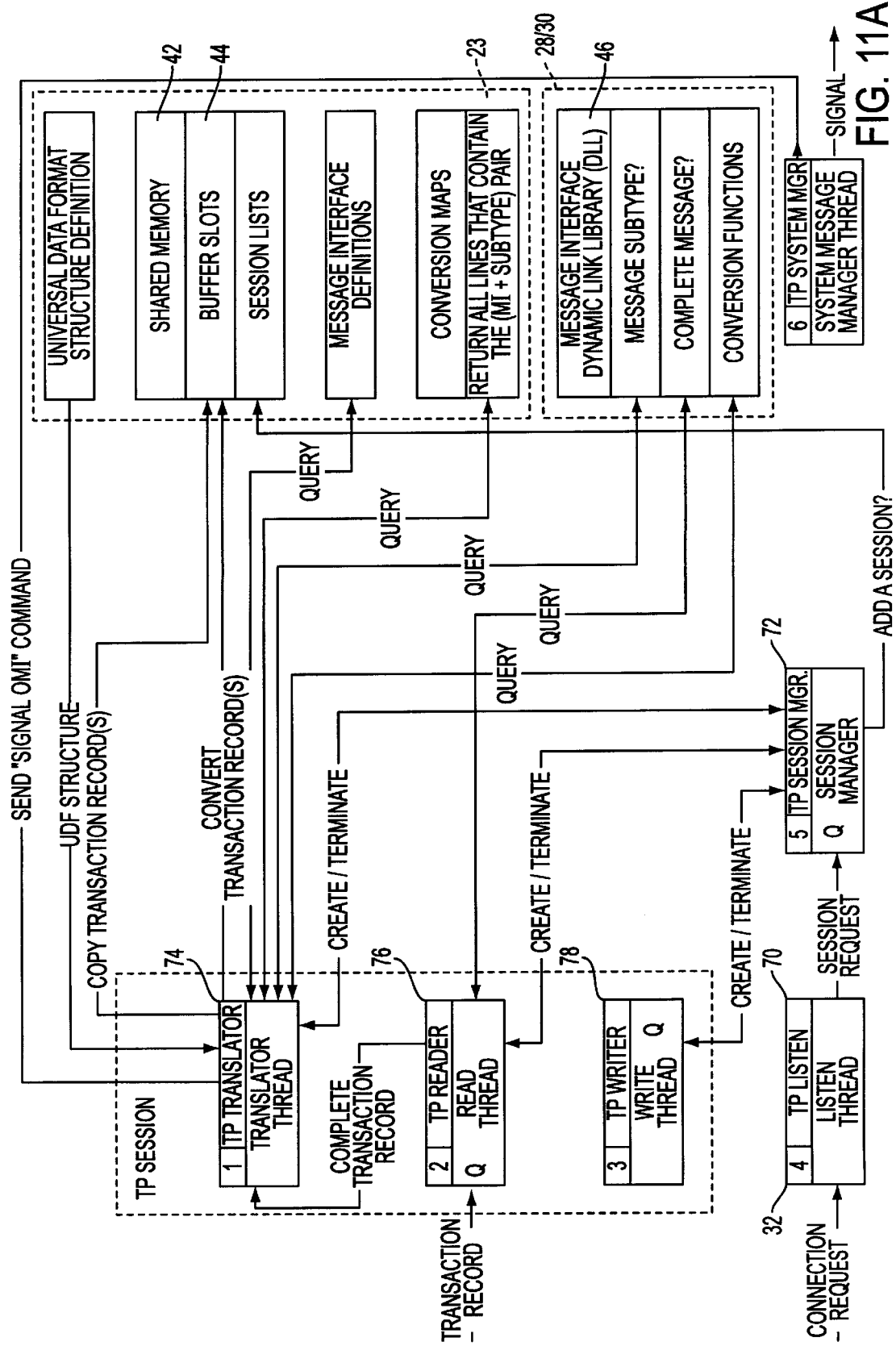
FIG. 11A is a flow diagram illustrating the preferred multiprocessing in the transaction engine on a decomposed task basis of a record received from a record generating device.

Referring now to FIG. 11A, a brief discussion of some of the processing protocols preferably employed in an exemplary embodiment of the transaction engine 22 will now be discussed. In this exemplary embodiment, the transaction engine 22 preferably uses multithreading to make the most efficient use of its central processing unit ("CPU"). As will be understood by one of many skill in the art, the transaction engine 22 may also employ multiprocessing techniques, i.e., plural CPUs. As is known in the art, multiprocessing takes advantage of a processing task that can be decomposed into several independent tasks. In multiprocessing each independent task is assigned to a separate CPU. This approach allows the independent tasks to be performed concurrently and speeds the overall execution time.

Similarly, an independent task can be further decomposed into two or more sub-tasks. As is also known to those skilled in the art, multithreading can be used to perform these sub-tasks concurrently to make the most efficient use of a single CPU. While one thread is reading an input port, another thread can perform a calculation, and a third thread can write to an output port.

As further detailed below, the transaction engine 22 preferably uses multithreading in a way which associates a command queue with each thread. These command queues are the communication mechanism for the threads. Each transaction processor may comprise the following threads:

a port listener (TP Listen);

a session manager (TP Session Manager);

a session translator (TP Translate);

a session reader (TP Read);

a session writer (TP Write).

Port Listener Thread

As explained above, the transaction engine 22 includes and controls a series of IMIs 28 and OMIs 30. Each MI has associated with it a logical port (32 and 34 respectively) and a DLL 46 (either discretely associated with a specific MI or as a distributed asset in the transaction engine 22) to convert the messages received by that port. The port listener thread (TP Listen 70) listens to the logical port 32 for an input record generating device requesting a new connection. When the listen thread receives a new connection request, it issues a session request to the TP Session Manager thread 72 and the transaction engine 22 creates a series of session threads to process the incoming data record. The TP Session Manager thread 72 accesses the associated transaction processor mapping file in the shared memory 42 to determine the IMI 28 that it should use. Similarly, the transaction processor accesses the IMI definition file in shared memory to determine the logical port 32 and address to listen to for the input generating device. When the TP Listen thread 70 receives a connection request, it issues a command to the TP Session Manager thread 72 command queue. This command triggers the TP Session Manager thread 72 to start up the TP Translate thread 74, TP Read thread 76, and TP Write thread 78.

Session Manager Thread

The TP Session Manager thread 72 manages the creation, administration, and deletion of all active transaction processor session threads (i.e., the session translator, session reader, session writer). The TP Session Manager thread 72 receives requests for new connections from the TP Listen thread 70. The transaction engine 22 allocates a series of session threads, sometimes referred to as an input session group, for each new connection. When the session threads are finished with the connection, the session manager creates a session remover thread which issues a command to each individual session thread and then clears the system. The TP Session Manager thread 72 may also issue the following commands to perform the following functions:

retrieve the identity of the shared buffer element slot 44 that contains the outgoing record;

determine whether an output session thread exist for the output record;

create an output session thread(s) if it/they do not already exist;

signal the output session threads when the record conversion process is complete;

manage the allocation and deallocation of buffers 44 in shared memory 42.

When a session thread determines that a connection requires termination, either through natural completion or an error, the TP Session Manager thread 72 is notified through a remove session command with the session ID as an argument. The TP Session Manager thread 72 will then typically invoke a session remove thread and notify the related session threads to terminate by placing a command in their command queue. The session remove thread is a short-lived thread that methodically clears the threads which the TP Session Manager thread 72 originally created. The TP Write thread 78 is preferably the last session thread that the session remover thread eliminates. Prior to the TP Write thread 78 termination, it will send a disconnect over the connection to the downstream host device. Once the session threads are removed, the session remove thread clears the session information from the shared memory 42 and removes any extraneous record structure information.

Session Read Thread

The TP Read thread listens 76 to an input record generating device for a connection request. When the record arrives, the TP Read thread 76 queries the DLL 46 of the IMI 28 associated with the connection for the number of bytes that the records should contain. Once the TP Read thread 76 receives a complete message, it passes control to the TP Translate thread 74 by placing a command in the TP Translate thread 74 command queue.

Session Translate Thread

The TP Translate thread 74 receives messages from the TP Read thread 76. The associated DLL 46 of the MI 28 for the connection will be queried to determine the message type of the record. The message type is a search parameter in the conversion map file retained in shared memory 42. This file will inform the TP Translate thread 74 which of the MIs, 28 or 30, needs to receive a copy of this transaction record. For each interested output MI 30, the transaction record data is copied into a separate buffer slot 44 in the shared memory 42. Each of these buffer slots 44 goes through the conversion process from the input format to the UDF, and finally to the output format.

Session Write Thread

Figure 11B:
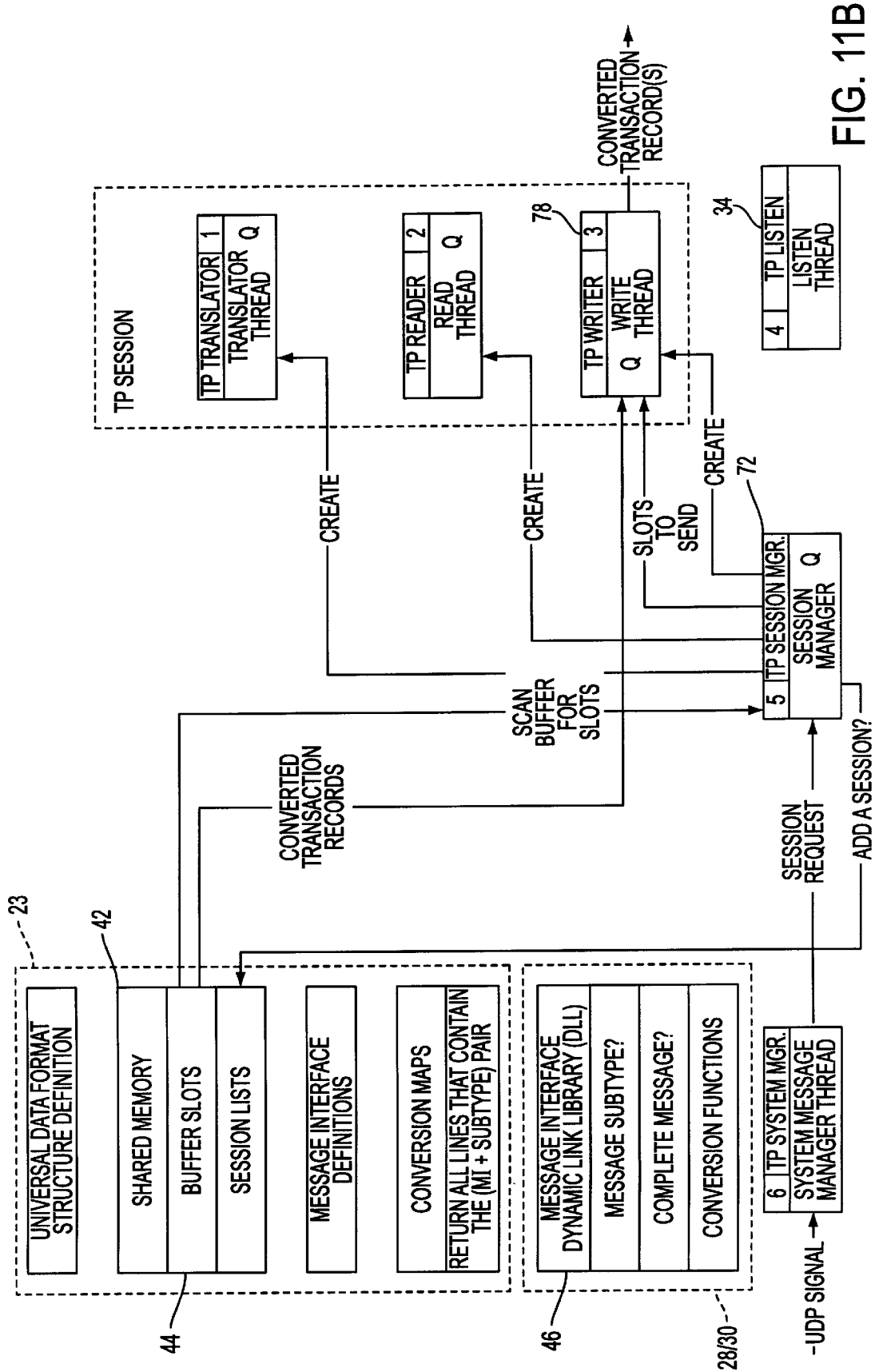
FIG. 11B is a flow diagram of the flow of a converted transaction record to a port associated with a specific output host device.

The TP Write thread 78 task will now be described in connection with FIG. 11B. The TP Write thread 78 writes the converted transaction record data to the port associated with the output host device. The TP Session Manager thread 72 signals the TP Write thread 78 when a transaction record conversion is complete. When the TP Write thread 78 receives this signal, it accesses the appropriate buffer slot 44 in shared memory 42 and writes that record to the associated output port, e.g., ports 34 or 34' (FIGS. 4–7).

Switching

Figure 4:
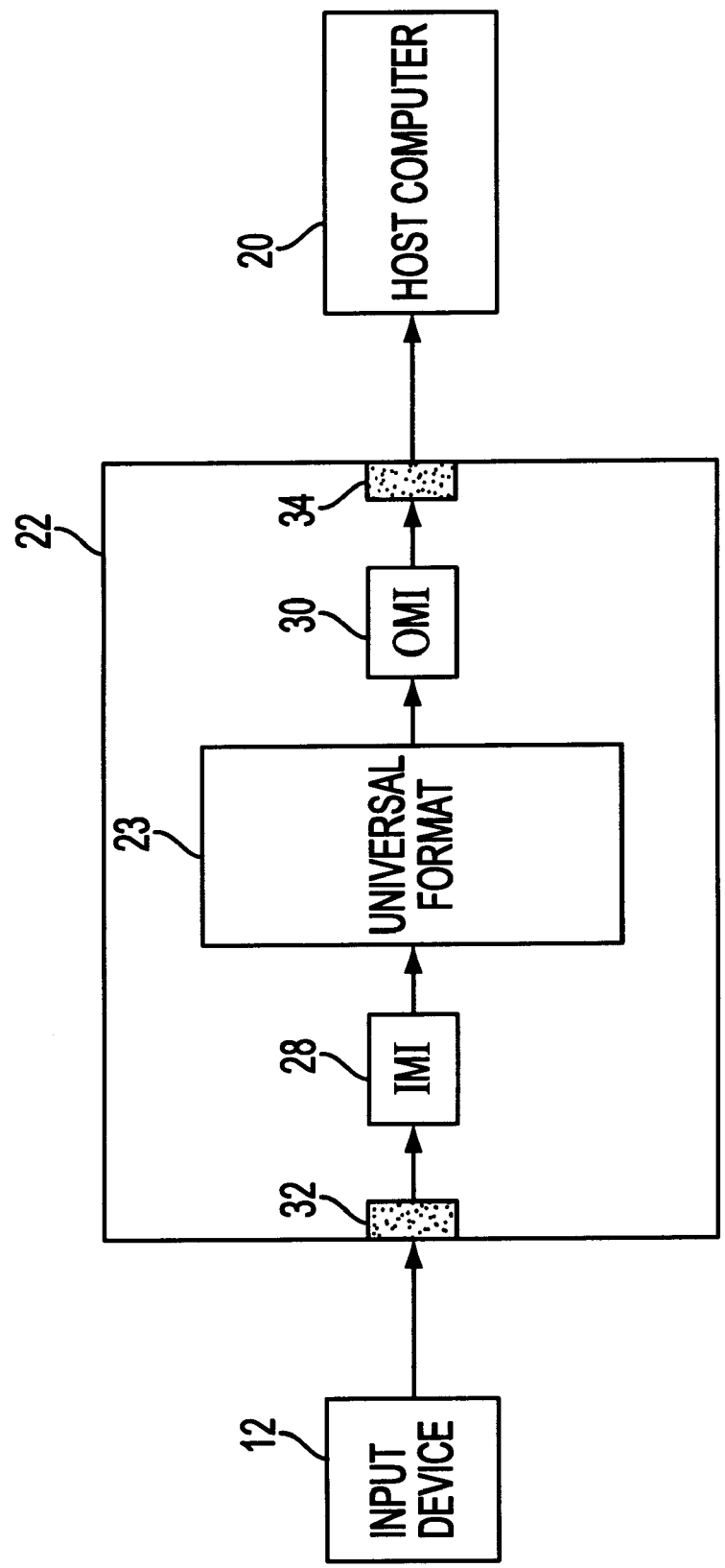
FIG. 4 is a schematic depiction of an exemplary management system including an input record generating device connected to a transaction engine.

Turning now to the system embodiment of FIG. 4, an exemplary input record generating device 12 is depicted which is connected to an input port 32 (in this case a serial port) of the transaction engine 22. The conversion engine 23 passes every input record that it receives over the input port 32 to the IMI 28 for conversion to the UDF. The conversion engine 23 senses when the conversion to the UDF is complete and signals the OMI 30 to convert the record to the desired output record format. The conversion engine 23 routes the converted record to the output port 34 (in this case a serial port). In this embodiment, the output port 32 is preferably connected to the output host device 20.

Figure 5:
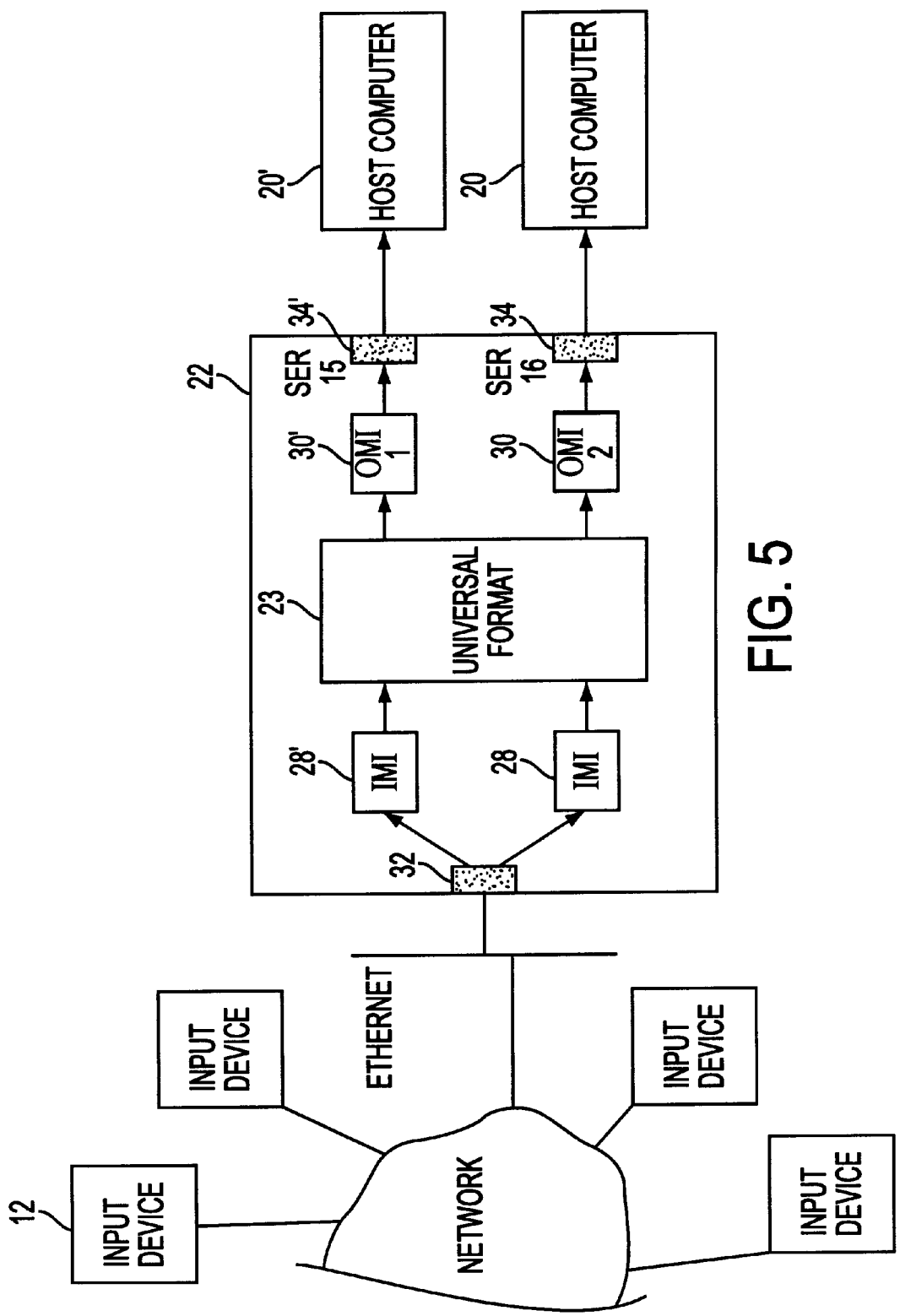
FIG. 5 is a depiction of an exemplary management system according to the present invention in which a plurality of input record generating devices are connected to one transaction engines using a shared port connection.

In the embodiment of FIG. 5, many-to-one or many-to-many switching based on addresses of the input devices is depicted. In this exemplary embodiment the input generating devices 12 are nodes of a network 20. Each input generating device 12 has a unique address. The transaction engine 22 receives input records from every networked input record generating device 12 through a single connection (e.g., an Ethernet port 32). When the transaction engine 22 receives an input record, based on its origin, it direct the appropriate IMI (28 or 28') to convert the record to the UDF. The conversion engine 23, using, e.g., the transaction processors described above, senses when the conversion to the universal format is complete and signals the appropriate OMI (30 or 30') to convert the record to the desired output format. The conversion engine 23 routes the converted record to the appropriate output port, 34 or 34'. In this embodiment, the output ports 34 and 34' are connected to the output host devices 20 and 20' respectively.

Figure 6:
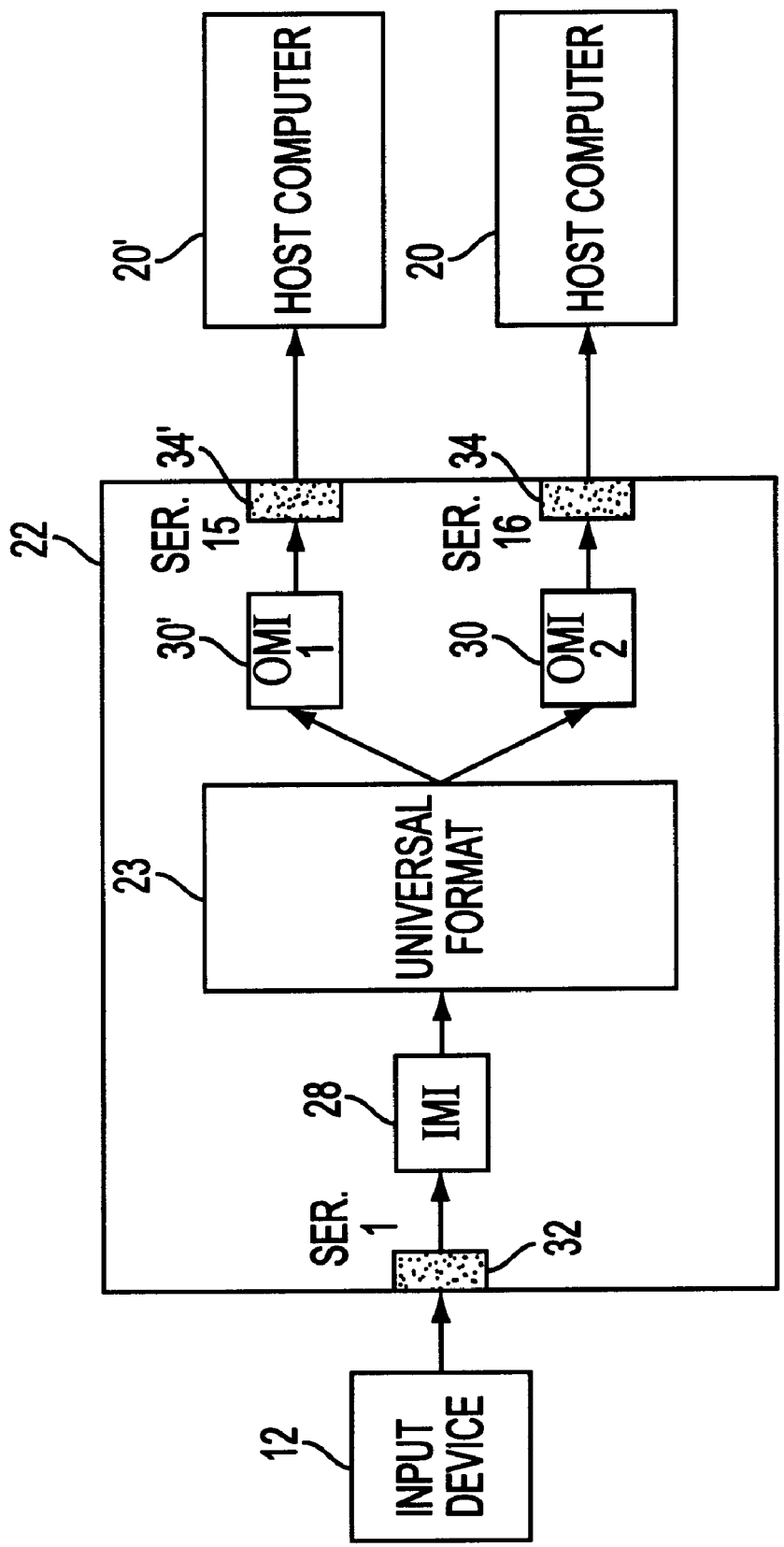
FIG. 6 is a depiction of yet another exemplary embodiment of a record management system according to the present invention in which an input record generating device is connected to a transaction engine from which records are distributed to multiple output host devices.

The embodiment of FIG. 6 is similar to the embodiment of FIG. 4 but depicts one-to-many switching based on information contained in the data or created by the input device. In this exemplary embodiment the input record generating device 12 is directly connected to the port 32 of the transaction engine 22 (in this example, a serial port). The difference, however, is that the data record from this single input device 12 is distributed to multiple output host devices 20 and 20', in this example via the SNA protocol. The transaction engine 22 passes every data record that it receives from the port 32 to the IMI 28 for conversion, by means of the conversion engine 23, to the UDF. The conversion engine 23 (using, e.g., the transaction processors described above) senses when the conversion to the UDF is complete and signals the appropriate OMI (30 or 30') to convert the record to its particular output format. The conversion engine 23 then routes the converted records to the appropriate output port(s), 34 and/or 34', each of which is, in the illustrated embodiment, connected to an output host device, 20 and 20' respectively.

Figure 7:
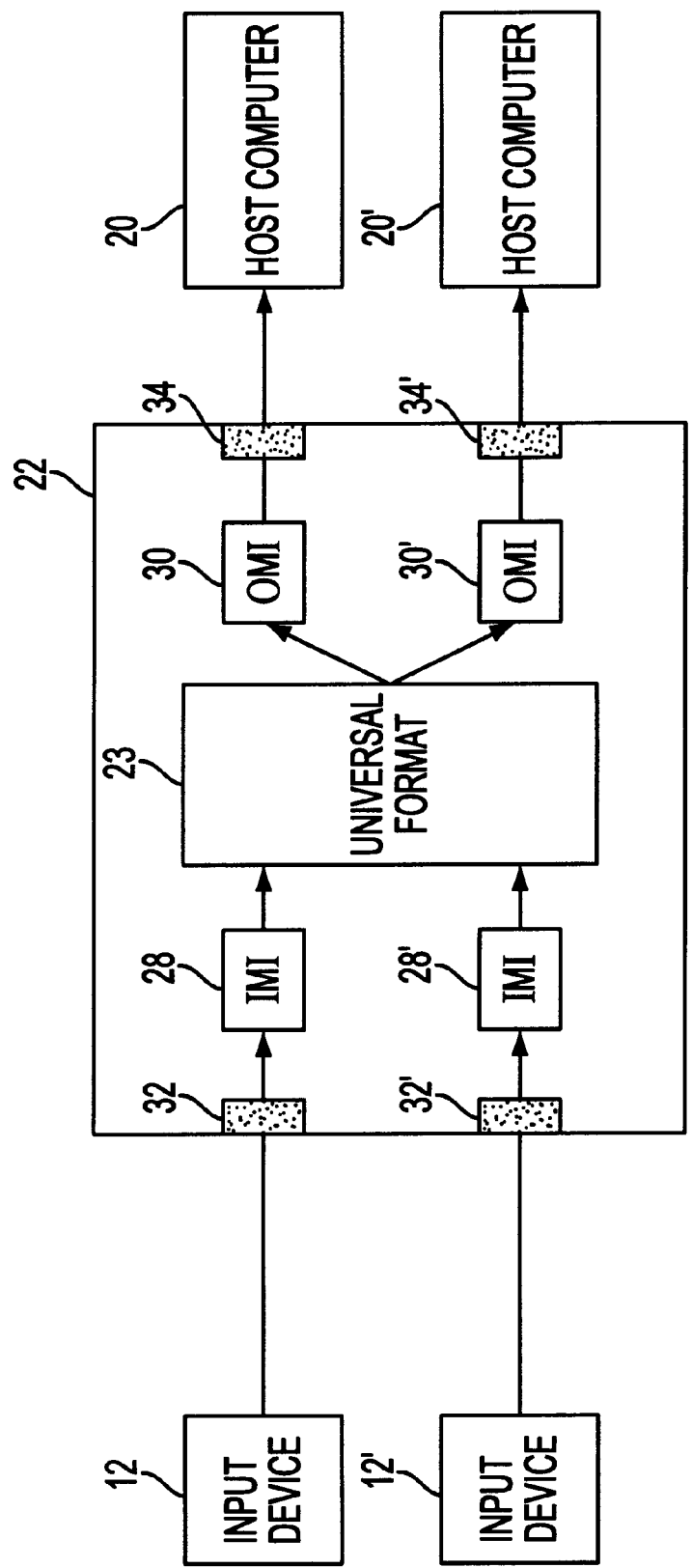
FIG. 7 is a depiction of yet another exemplary embodiment of the invention in which two or more input record generating devices are connected to a transaction engine and from which records from each input record generator may be distributed to one or to multiple output host devices.

The embodiment of FIG. 7 depicts either many-to-many or many-to-one switching based on information in the data created by the input device. In this embodiment, a plurality, i.e., at least two, input record generating devices 12 and 12', are each connected, via respective input ports 32 and 32' to the IMI's 28 and 28' respectively. In this embodiment, the records from each of the input record generating devices 12 and 12' may be routed to one or more host devices 20 and 20'. The conversion engine 23 converts records received at either of the IMI's, 28 or 28'. The conversion engine 23, again using the transaction processors described above, senses when the conversion to the UDF is complete and then signals the appropriate OMI(s), 30 and/or 30' to convert the records to its particular output format. The conversion engine then routes the converted records to the appropriate output port(s), 34 and/or 34' each of which, in the illustrated embodiment, is directly connected to an output host device, e.g., 20 and 20' respectively.

The foregoing description of the preferred embodiments of the invention have been presented for purposes of illustration and description. They are not intended to be exhaustive or to limit the invention to the precise forms disclosed, and obviously many modifications and variations are possible in light of the above teaching. These embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

We claim:

1. A real time record retrieval and storage system comprising:
   at least one record generating device for generating a stream of records having a predetermined form of information content, structure and format;
   a conversion device, including an input interface responsive to a signal from said record generating device for receiving the stream of records from said record generating device, converting said record stream into a intermediate, universal form of information content, structure and format, and from the intermediate universal form into a predetermined output form of information content, structure and format for outputting a stream of records to an output host device; and
   an output host device, responsive to a signal from said conversion device, for receiving a stream of records in said predetermined output form of information content, structure and format.

2. The system according to claim 1 further comprising a plurality of record generating devices, wherein said conversion device further comprises an input interface responsive to each of the record generating devices.

3. The system according to claim 2 wherein said plurality of record generating devices are networked and said input interface comprises a network interface.

4. The system according to claim 3 wherein said conversion device further comprises an input port connected to at least two input interfaces, and further comprising at least two record generating devices configured as nodes on a network, each of said nodes having a unique address, and wherein said conversion device receives input records from said networked generating devices via said inlet port and, based on said unique address, directs said input records to one of said input interfaces.

5. The system according to claim 4 wherein said data conversion device further comprises at least two output interfaces, each of said outlet interfaces being connected to an output port and wherein said conversion device includes means for directing converted records to an appropriate one of said output interfaces, said system further comprising at least two output host devices for receiving output records, each of said output host devices being connected to one of said outlet ports.

6. The system according to claim 2 wherein said data conversion device further comprises at least one input port and at least one output port and wherein said at least one record generating device is directly connected to said input port; and wherein said output host device comprises a data processing device directly connected to said output port.

7. The system according to claim 2 wherein said conversion device comprises one or more discrete devices located remotely from said host device, each of said discrete devices being associated with at least one of said plurality of generating devices.

8. The system according to claim 2 wherein said conversion device is centrally located in the vicinity of said output host device.

9. The system according to claim 1 wherein said conversion device comprises at least two input interfaces, each for supporting a different predetermined input record form of information content, structure and format.

10. The system according to claim 9 wherein each of said input interfaces converts one of said predetermined input record forms into said intermediate universal form.

11. The system according to claim 10 wherein said conversion device further comprises at least one output interface, said output interface being operable to convert records from said intermediate, universal form into said predetermined output form.

12. The system according to claim 11 wherein said output interface includes a memory for containing function for converting record streams from the intermediate universal form to said predetermined output form.

13. The system according to claim 6 wherein said input interface and said output interface are bi-directional whereby record streams from said host device may be received at said output interface, converted by said conversion device into said intermediate universal form and from said intermediate universal form into a predetermined input form of one of said record generating devices whereby record streams from said host device may be received by said record generating device.

14. The conversion device according to claim 13 wherein said input interface and output interface are bi-directional, whereby a record stream may be received at said output interface and a converted record stream output from said input interface.

15. The system according to claim 9 wherein said input interfaces each includes a memory for containing conversion functions for converting a record stream received in a predetermined input form into the intermediate universal form.

16. The system according to claim 1 further comprising an input port wherein said input port is connected to said input interface, and wherein said record streams contain output host device address data, said system further comprising a plurality of output host devices and said conversion device further comprising an output interface associated with at least some of said host devices and wherein the stream of records from said record generating device is distributed to one or more of said host devices in accordance with said address information.

17. The system according to claim 1 wherein said conversion device further comprises at least two output interfaces, each of said outlet interfaces being connected to an output port and wherein said conversion device includes means for directing converted stream of record to an appropriate one of said output interfaces, said system further comprising at least two output host devices, each of said output host devices comprising a data processing devices supported by one of said outlet ports.

18. The system according to claim 1 further comprising a plurality of record generating devices for generating streams of records of respective predetermined forms of information content, structure and format and wherein said conversion device comprises a port and a input interface for at least two of said plurality of record generating devices whereby the streams of records from said at least two record generating devices may be directed to one output host device.

19. The system according to claim 1 further comprising at a plurality of record generating devices for generating streams of records having respective predetermined forms of information content, structure and format and wherein said conversion device comprises a port and a input interface for at least two record generating devices and said output host device comprises at least two output host devices and said conversion devices comprises a port and an output interface for each of said at least two output host devices, whereby streams of records from either of said at least two record generating devices may be selectively directed to either or both of said at least two output host devices.

20. The system according to claim 1 wherein said conversion device further comprises at least one input port and two output ports and at least two output interfaces, wherein said input port is associated with said record generating device, and each of said output interfaces associated with one of said outputs ports, and wherein said conversion device includes means for directing record streams converted into a predetermined output form to an appropriate one of said output interfaces, said system further comprising at least two output host devices, each of said output host devices comprising a data processing device associated with one of said outlet ports.

21. The system according to claim 20 further comprising a plurality of networked record generating devices connected to said input port.

22. The system according to claim 1 wherein said conversion device comprises at least two input ports and at least two output ports, each of said input and output ports having an associated interface and wherein the interfaces associated with the input ports include means for converting said input records into said intermediate universal form and the interfaces associated with the output ports include means for converting records in the intermediate universal form into records in one ore more predetermined output forms and directing said predetermined output form records, via said output interface, to one or more of said output ports.

23. The system according to claim 1 wherein said conversion device is located remotely from said host device in the vicinity of said record generating device.

24. The system according to claim 1 wherein said input interface includes a memory for containing conversion functions for converting record streams from the predetermined input form to the intermediate, universal form.

25. The system according to claim 1 wherein said conversion device further comprises a memory for storing record streams during the conversion process.

26. The system according to claim 25 wherein said memory is a shared memory comprising a plurality of buffer memories, at least one of said buffer memories being used to store record streams in the input form, one of said buffer memories being used to store record streams in the intermediate universal form and one of said buffer memories being used to store records in the predetermined output form.

27. A conversion device for receiving a stream of records in different forms of information content, structure and format from a plurality of record generating devices, said conversion device comprising:

(a) at least one input interface for receiving incoming record streams, said input interface supporting a predetermined input record form;

(b) a conversion engine for receiving an input record stream from said input interface in said predetermined input record form and converting said input record stream into a predetermined intermediate universal form of information content, structure and format;

(c) at least one output interface for receiving record streams in said intermediate universal form into a predetermined output form of information content, structure and format in order to support said predetermined output form.

28. The conversion device according to claim 27 wherein said conversion device is a real-time conversion device.

29. The conversion device according to claim 27 wherein said conversion device includes a first storage means for temporary storage of record streams during conversion and a library of conversion rules for converting input record streams from one or more record generating devices which generate record streams of one or more predetermined input record forms into said intermediate universal form and for converting records from said intermediate universal form into one or more predetermined output record forms.

30. The conversion device according to claim 27 wherein said input interface further comprises a memory for containing functions for converting record streams from the incoming record form to the intermediate universal form.

31. The conversion device according to claim 27 wherein said output interface further comprises a memory for containing functions for converting from the intermediate universal form to a predetermined output form.

32. The conversion device according to claim 27 further comprising a library containing conversion protocols for converting record streams between one said input data form and one of the predetermined output forms.

33. The conversion device according to claim 27 wherein said conversion engine further comprises a memory including buffers for storing records in the predetermined input form, the universal form and the predetermined output form during record conversion.

34. A real time method of converting record streams received in one or more input record forms of information content, structure and format into one or more output record forms of information content, structure and format comprising the steps of:

receiving a record stream containing information organized in a predetermined input form from a record generating device;

converting said input record stream into an intermediate universal form of information content, structure and format;

transmitting the record stream in said predetermined output form to an output host device.

35. The method according to claim 34 further comprising the step of recognizing a connection request from said record generating device prior to the step of receiving.

36. The method according to claim 34 further comprising the step of issuing a connection request to the output host device prior to the step of transmitting.

37. The method according to claim 34 further comprising the step of receiving, at the conversion device, a response message from said output host device.

38. The method according to claim 37 further comprising the steps of converting said response message from the form of information content, structure and format in which it was received to said intermediate universal form and from said intermediate universal form to a form recognizable by said record generating device and transmitting said converted message to said record generating device.

39. The method according to claim 34 wherein said step of converting further comprises:

copying record streams received in said predetermined input form into a first buffer memory;

copying converted record streams in said intermediate universal form into a second buffer memory; and copying converted record streams in said predetermined output form into a third buffer memory.

40. The method according to claim 34 further comprising the steps of adding at least one additional predetermined output form, and said step of transmitting further comprises transmitting said record streams in said additional predetermined output form.

41. The method according to claim 34 further comprising the steps of adding at least one additional predetermined output form and said step of transmitting further comprises transmitting said record streams in said additional predetermined output form.

42. The method according to claim 34 further comprising the steps of changing the output host device, said changed output host device accepting record streams in a different predetermined output form than said first mentioned predetermined output form, and said step of transmitting further comprises transmitting said records in said different predetermined output form.

43. The method according to claim 34 wherein said record stream as received includes no output host device address and wherein said second step of converting is based upon the content of said record stream.

* * * * *